(12) United States Patent
Tang et al.

(10) Patent No.: US 9,678,309 B2
(45) Date of Patent: Jun. 13, 2017

(54) OPTICAL IMAGE CAPTURING SYSTEM

(71) Applicant: ABILITY OPTO-ELECTRONICS TECHNOLOGY CO.LTD., Taichung (TW)

(72) Inventors: Nai-Yuan Tang, Taichung (TW); Yeong-Ming Chang, Taichung (TW)

(73) Assignee: Ability Opto-Electronics Technology Co., Ltd., Taichung (TW)

( * ) Notice: Subject to any disclaimer, the term of this patent is extended or adjusted under 35 U.S.C. 154(b) by 69 days.

(21) Appl. No.: 14/744,492

(22) Filed: Jun. 19, 2015

(65) Prior Publication Data

US 2016/0299319 A1    Oct. 13, 2016

(30) Foreign Application Priority Data

Apr. 10, 2015  (TW) .............................. 104111532 A

(51) Int. Cl.
   *G02B 13/18*    (2006.01)
   *G02B 3/02*     (2006.01)
   *G02B 13/00*    (2006.01)
   *G02B 9/64*     (2006.01)

(52) U.S. Cl.
   CPC ........... *G02B 13/0045* (2013.01); *G02B 9/64* (2013.01)

(58) Field of Classification Search
   CPC .. G02B 13/0045; G02B 27/0025; G02B 9/64; H04N 5/2254
   See application file for complete search history.

(56) References Cited

U.S. PATENT DOCUMENTS

| | | | |
|---|---|---|---|
| 9,366,845 B2 * | 6/2016 | Huang | ................ G02B 13/002 |
| 2015/0009578 A1 * | 1/2015 | Shinohara | ................ G02B 9/64 |
| | | | 359/708 |

FOREIGN PATENT DOCUMENTS

TW             201403166 A    1/2014

* cited by examiner

*Primary Examiner* — Alicia M Harrington
(74) *Attorney, Agent, or Firm* — Muncy, Geissler, Olds & Lowe, P.C.

(57) ABSTRACT

The present disclosure discloses an optical image capturing system. The optical image capturing system includes a first lens with refractive power, a second lens with refractive power, a third lens with refractive power, a fourth lens with refractive power, a fifth lens with refractive power, a sixth lens with refractive power and a seventh lens with refractive power sequentially arranged from an object side to an image side along the optical axis. At least one of the first through sixth lens has positive refractive power. The seventh lens may have negative refractive power and both image side and object side surfaces of the seventh lens are aspheric. The optical image capturing system can increase aperture value and improve the imagining quality for the application of compact cameras.

25 Claims, 18 Drawing Sheets

OPTICAL IMAGE CAPTURING SYSTEM

CROSS-REFERENCE TO RELATED APPLICATION

This application claims the benefit of Taiwan Patent Application No. 104111532, filed on Apr. 10, 2015, in the Taiwan Intellectual Property Office, the disclosure of which is incorporated herein in its entirety by reference.

BACKGROUND OF THE INVENTION

1. Field of the Invention

The present disclosure relates to an optical image capturing system, and more particularly to a compact optical image capturing system which can be applied to electronic products.

2. Description of the Related Art

In recent years, with the rise of portable electronic devices having camera functionalities, the demand for an optical image capturing system is raised gradually. The image sensing device of ordinary photographing camera is commonly selected from charge coupled device (CCD) or complementary metal-oxide semiconductor sensor (CMOS Sensor). In addition, as advanced semiconductor manufacturing technology enables the minimization of pixel size of the image sensing device, the development of the optical image capturing system is directed towards the field of high pixels. Therefore, the requirement for high imaging quality is rapidly raised.

The traditional optical image capturing system of a portable electronic device comes with different designs, including a two-lens or a three-lens design. The manufacture has kept on enhancing the portable devices pixels quality, while the consumers demand on the thin portable device is increasing; such as the night vision and photography modes, or demand of a wide angle for the self-timer function. But design of large aperture stop system often encounters more difficult technical problems, for example, the degraded image quality and complicated manufacturing process. Moreover, the distortion may increase due to the optical system designed with the wide angle. So, the optical image capturing system in prior arts cannot meet the requirement of the higher order camera lens module.

Therefore, how to effectively increase the aperture value and the view angle of the optical image capturing system and further improve image quality for the image formation becomes a quite important issue.

SUMMARY OF THE INVENTION

The aspect of embodiment of the present disclosure directs to an optical image capturing system and an optical image capturing lens which use combination of refractive powers, convex and concave surfaces of seven-piece optical lenses (the convex or concave surface in the disclosure denotes the geometrical shape of an image-side surface or an object-side surface of each lens on an optical axis) to further increase the aperture value and the view angle of the optical image capturing system effectively and to increase imaging quality and the number of pixels so as to be applied to compact electronic products.

The terms and its definitions to the lens element parameters in the present embodiment are shown as below for further reference.

The Lens Element Parameter Related to a Length or a Height in the Lens Element

A height for image formation of the optical image capturing system is denoted by HOI. A height of the optical image capturing system is denoted by HOS. A distance from the object-side surface of the first lens element to the image-side surface of the seventh lens element is denoted by InTL. A distance from the image-side surface of the seventh lens element to the image plane is denoted by InB, and InTL+InB=HOS. A distance from the aperture stop (aperture) to the image plane is denoted by InS. A distance from the first lens element to the second lens element is denoted by In12 (instance). A central thickness of the first lens element of the optical image capturing system on the optical axis is denoted by TP1 (instance).

The Lens Element Parameter Related to a Material in the Lens Element

An Abbe number of the first lens element in the optical image capturing system is denoted by NA1 (instance). A refractive index of the first lens element is denoted by Nd1 (instance).

The Lens Element Parameter Related to a View Angle in the Lens Element

A view angle is denoted by AF. Half of the view angle is denoted by HAF. A major light angle is denoted by MRA.

The Lens Element Parameter Related to Exit/Entrance Pupil in the Lens Element

An entrance pupil diameter of the optical image capturing system is denoted by HEP. A maximum effective half diameter of any surface of single lens element means the vertical distance between the optical axis and the point of intersection of the incident light of the maximum view angle of the system passes through the farthest edge of the entrance pupil and said surface of the lens element. For example, the maximum effective half diameter of the object-side surface of the first lens element is denoted as EHD11. The maximum effective half diameter of the image-side of the first lens element is denoted as EHD12. The maximum effective half diameter of the object-side surface of the second lens element is denoted as EHD21. The maximum effective half diameter of the image-side surface of the second lens element is denoted as EHD22. The maximal effective half diameter of any surfaces of the remaining lens elements of the optical image capturing system can be referred as mentioned above.

The Lens Element Parameter Related to a Depth of the Lens Element Shape

A distance in parallel with an optical axis from a maximum effective half diameter position to an axial point on the object-side surface of the seventh lens element is denoted by InRS71 (Depth of the maximum effective half diameter position or SAG of the maximum effective half diameter). A distance in parallel with an optical axis from a maximum effective half diameter to an axial point on the image-side surface of the seventh lens element is denoted by InRS72 (Depth of the maximum effective half diameter position or SAG of the maximum effective half diameter). Depth (sinkage) of the maximum effective half diameter of object-side surface or image-side surface of the other lens elements can be referred as mentioned above.

The Lens Element Parameter Related to the Lens Element Shape

A critical point C is a tangent point on a surface of a specific lens element, and the tangent point is tangent to a plane perpendicular to the optical axis and the tangent point cannot be a crossover point on the optical axis. To follow the past, a distance perpendicular to the optical axis between a critical point C51 on the object-side surface of the fifth lens element and the optical axis is HVT51 (instance). A distance perpendicular to the optical axis between a critical point C52 on the image-side surface of the fifth lens element and the optical axis is HVT52 (instance). A distance perpendicular to the optical axis between a critical point C61 on the object-side surface of the sixth lens element and the optical axis is HVT61 (instance). A distance perpendicular to the optical axis between a critical point C62 on the image-side surface of the sixth lens element and the optical axis is HVT62 (instance). The other denotations of critical point on object-side surface or image-side surface of the other lens elements such as the seventh lens element and a vertical distance between the critical point and the optical axis can be referred as mentioned above.

The object-side surface of the seventh lens element has one inflection point IF711 which is nearest to the optical axis, and the sinkage value of the inflection point IF711 is denoted by SGI711 (instance). A distance perpendicular to the optical axis between the inflection point IF711 and the optical axis is HIF711 (instance). The image-side surface of the seventh lens element has one inflection point IF721 which is nearest to the optical axis and the sinkage value of the inflection point IF721 is denoted by SGI721 (instance). A distance perpendicular to the optical axis between the inflection point IF721 and the optical axis is HIF721 (instance). The object-side surface of the seventh lens element has one inflection point IF712 which is the point nearest to the optical axis, and the sinkage value of the inflection point HIF412 is denoted by SGI412 (instance).

The object-side surface of the seventh lens element has one inflection point IF712 which is a second nearest point to the optical axis, and the sinkage value of the inflection point IF712 is denoted by SGI712 (instance). A distance perpendicular to the optical axis between the inflection point IF711 and the optical axis is HIF712 (instance). The image-side surface of the seventh lens element has one inflection point IF722 which is a second nearest point to the optical axis and the sinkage value of the inflection point IF722 is denoted by SGI722 (instance). A distance perpendicular to the optical axis between the inflection point IF722 and the optical axis is HIF722 (instance). The object-side surface of the seventh lens element has one inflection point IF722 which is second nearest point to the optical axis, and the sinkage value of the inflection point HIF722 is denoted by SGI722 (instance).

The object-side surface of the seventh lens element has one inflection point IF713 which is a third point nearest to the optical axis, and the sinkage value of the inflection point IF713 is denoted by SGI713 (instance). A distance perpendicular to the optical axis between the inflection point IF713 and the optical axis is HIF713 (instance). The image-side surface of the seventh lens element has one inflection point IF723 which is a third point nearest to the optical axis and the sinkage value of the inflection point IF723 is denoted by SGI723 (instance). A distance perpendicular to the optical axis between the inflection point IF721 and the optical axis is HIF723 (instance). The object-side surface of the seventh lens element has one inflection point IF713 which is third point nearest to the optical axis, and the sinkage value of the inflection point HIF723 is denoted by SGI723 (instance).

The Lens Element Parameter Related to an Aberration

Optical Distortion for image formation in the optical image capturing system is denoted by ODT. TV distortion for image formation in the optical image capturing system is denoted by TDT. Further, the range of the aberration offset for the view of image formation may be limited to 50%-100% field. An offset of the spherical aberration is denoted by DFS. An offset of the coma aberration is denoted by DFC.

The disclosure provides an optical image capturing system, an object-side surface or an image-side surface of the seventh lens element has inflection points, such that the angle of incidence from each view field to the seventh lens element can be adjusted effectively and the optical distortion and the TV distortion can be corrected as well. Besides, the surfaces of the seventh lens element may have a better optical path adjusting ability to acquire better imaging quality.

The disclosure provides an optical image capturing system, sequentially arranged from an object side to an image side, including a first, second, third, fourth, fifth, sixth, seventh lens elements and an image plane. The first lens element may have refractive power and the seventh lens element may have refractive power. An object-side surface and an image-side surface of the seventh lens element are aspheric. Focal lengths of the first through seventh lens elements are f1, f2, f3, f4, f5, f6 and f7, respectively. A focal length of the optical image capturing system is f. An entrance pupil diameter of the optical image capturing system is HEP. A distance from the object-side surface of the first lens element to the image plane is HOS. A distance on the optical axis from the object-side surface of the first lens element to the image-side surface of the seventh lens element is InTL. A sum of an absolute value of each distance in parallel with the optical axis from a maximum effective half diameter on an object-side surface of each of the seventh lens elements to an axial point on the object-side surface of each of the seventh lens elements is InRSO. A sum of an absolute value of each distance in parallel with the optical axis from a maximum effective half diameter on an image-side surface of each of the seven lens elements to an axial point on the image-side surface of each of the seven lens elements is InRSI. A sum of InRSO and InRSI is Σ|InRSI|, and the following relations are satisfied: 1.2≤f/HEP≤6.0, 0.5≤HOS/f≤5.0 and 0<Σ|InRSI|/InTL≤5.

The disclosure provides another optical image capturing system, sequentially arranged from an object side to an image side, including a first, second, third, fourth, fifth, sixth, seventh lens elements and an image plane. The first lens element has positive refractive power, and an object-side surface and an image-side surface of the first lens element are aspheric. The second lens element has refractive power. The third lens element has refractive power. The fourth lens element has refractive power. The fifth lens element has refractive power. The sixth lens element has refractive power. The seventh lens element has refractive element, and an object-side surface and an image-side surface of the seventh lens element are aspheric. At least one surface of at least two lens elements of the first through seventh lens elements respectively have at least one inflection point, and at least one lens element of the second through seventh lens elements has positive refractive power. Focal lengths of the first through seventh lens elements are f1, f2, f3, f4, f5, f6 and f7 respectively. A focal length of the optical image capturing system is f. An entrance pupil diameter of the optical image capturing system is HEP. A distance from the object-side surface of the first lens element to the image plane is HOS. A distance from the object-side surface of the first lens element to the image-side surface of the seventh lens element is InTL. A sum of an absolute value of each distance in parallel with the optical axis from a maximum effective half diameter position on an object-side surface of each of the seven lens elements to an axial point on the object-side surface of each of the seven lens elements is InRSO. A sum of an absolute value of each distance in parallel with the optical axis from a maximum effective half diameter position on an image-side surface of each of the seven lens elements to an axial point on the image-side surface of each of the seven lens elements is InRSI. A sum of InRSO and InRSI is Σ|InRSI|, and the following relations are satisfied: $1.2 \leq f/HEP \leq 6.0$, $0.5 \leq HOS/f \leq 5.0$ and $0 < \Sigma|InRSI|/InTL \leq 5$.

The disclosure provides another optical image capturing system, sequentially arranged from an object side to an image side, including a first, second, third, fourth, fifth, sixth and seventh lens elements and an image plane. At least one of the object-side surface and the image-side surface of the seventh lens element has at least one inflection point, wherein the optical image capturing system has seven lens elements with refractive power and at least one surface of at least two lens elements of the first through sixth lens elements have at least one inflection point. The first lens element has positive refractive power. The second lens element has refractive power. The third lens element has refractive power. The fourth lens element has refractive power. The fifth lens element has refractive power. The fifth lens element has refractive power. The sixth lens element has positive refractive power and an object-side surface and an image-side surface of the sixth lens element are aspheric. The seventh lens element has negative refractive power and an object-side surface and an image-side surface of the seventh lens element are aspheric. Focal lengths of the first through seventh lens elements are f1, f2, f3, f4, f5, f6 and f7, respectively. A focal length of the optical image capturing system is f. An entrance pupil diameter of the optical image capturing system is HEP. Half of a maximal view angle of the optical image capturing system is HAF. A distance from the object-side surface of the first lens element to the image plane is HOS. Optical distortion and TV distortion for image formation in the optical image capturing system are ODT and TDT, respectively. A distance from the object-side surface of the first lens element to the image-side surface of the seventh lens element is InTL. A sum of an absolute value of each distance in parallel with the optical axis from a maximum effective half diameter position on an object-side surface of each of the seven lens elements to an axial point on the object-side surface of each of the seven lens elements is InRSO. A sum of an absolute value of each distance in parallel with the optical axis from a maximum effective half diameter position on an image-side surface of each of the seven lens elements to an axial point on an image-side surface of each of the seven lens elements is InRSI. A sum of InRSO and InRSI is Σ|InRSI|, and the following relations are satisfied: $1.2 \leq f/HEP \leq 3.0$, $0.4 \leq |\tan(HAF)| \leq 3.0$, $0.5 \leq HOS/f \leq 3.0$, $|TDT| < 60\%$, $|ODT| \leq 50\%$, and $0 < \Sigma|InRSI|/InTL \leq 5$.

When $|f1| > f7$ is satisfied, the height of optic system (HOS) of the optical image capturing system can be shortened for achieving the minimization.

When $|f2|+|f3|+|f4|+|f5|+|f6|$ and $|f1|+|f7|$ are satisfied, at least one of the second to the sixth lens elements may have weak positive refractive power or weak negative refractive power. The weak refractive power indicates that an absolute value of the focal length of a specific lens element is greater than 10. When at least one of the second to the sixth lens elements has the weak positive refractive power, the positive refractive power of the first lens element can be shared, such that the unnecessary aberration will not appear too early. On the contrary, when at least one of the second to the sixth lens elements has the weak negative refractive power, the aberration of the optical image capturing system can be corrected and fine tuned.

The seventh lens element may have negative refractive power and a concave image-side surface. Hereby, the back focal length is reduced for keeping the miniaturization, to miniaturize the lens element effectively. In addition, at least one of the object-side and the image-side surfaces of the seventh lens element may have at least one inflection point, such that the angle of incident with incoming light from an off-axis view field can be suppressed effectively and the aberration in the off-axis view field can be corrected further.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1A:
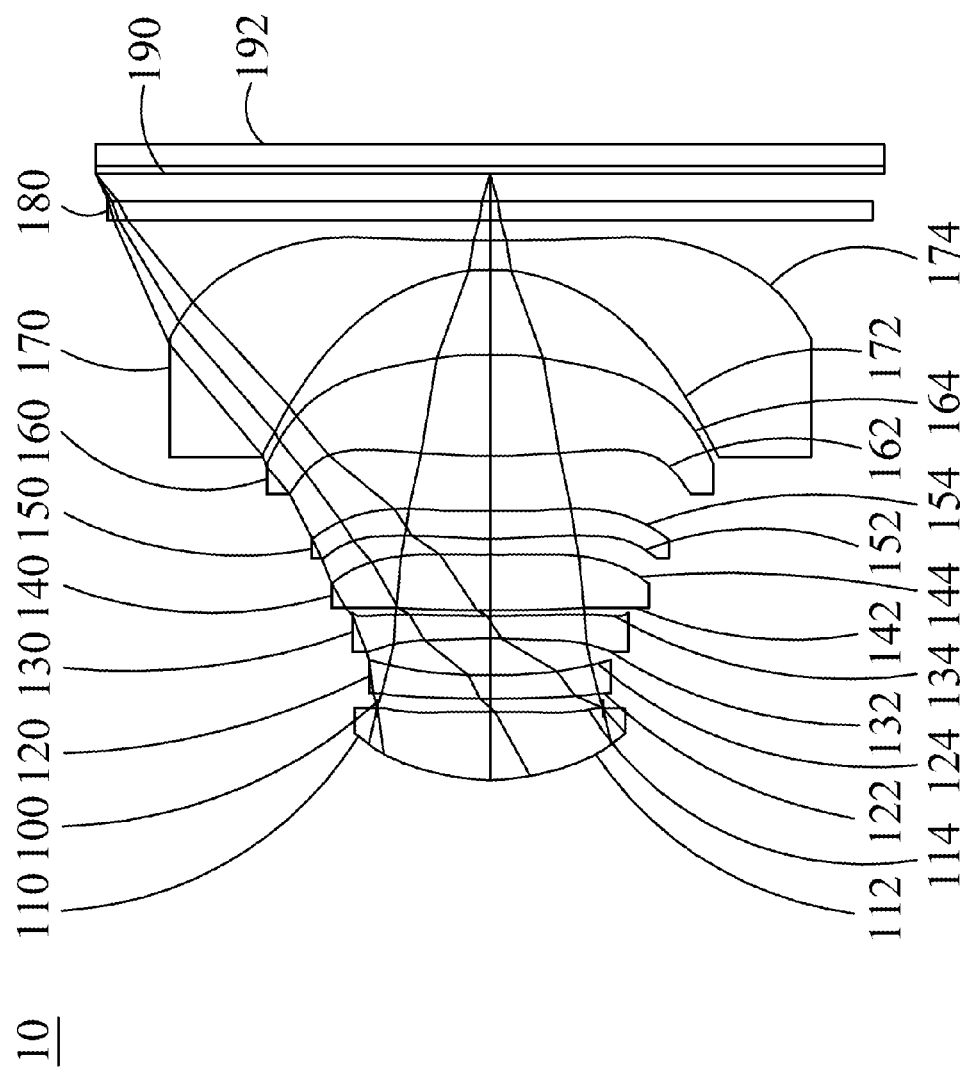
FIG. 1A is a schematic view of the optical image capturing system according to the first embodiment of the present application.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

An optical image capturing system, sequentially arranged from an object side to an image side, includes a first, second, third, fourth, fifth, sixth and seventh lens elements with refractive power and an image plane. The optical image capturing system may further include an image sensing device which is disposed on an image plane. The image height may be close to 3.91 mm in each of the following embodiments.

The optical image capturing system is to use three sets of wavelengths which are 486.1 nm, 587.5 nm and 656.2 nm, respectively, wherein 587.5 nm is served as the primary reference wavelength and 555 nm is served as a reference wavelength for retrieving technical features.

A ratio of the focal length f of the optical image capturing system to a focal length fp of each of lens elements with positive refractive power is PPR. A ratio of the focal length f of the optical image capturing system to a focal length fn of each of lens elements with negative refractive power is NPR. A sum of the PPR of all lens elements with positive refractive power is ΣPPR. A sum of the NPR of all lens elements with negative refractive powers is ΣNPR. It is beneficial to control the total refractive power and the total length of the optical image capturing system when following relation is satisfied: 0.5≤ΣPPR/|ΣNPR|≤2.5. Preferably, the following relation may be satisfied: 1≤ΣPPR/|ΣNPR|≤2.0.

The first lens element may have positive refractive power and a convex object-side surface. Hereby, strength of the positive refractive power of the first lens element can be fined-tuned, so as to reduce the total length of the optical image capturing system.

The second lens element may have negative refractive power and a convex object-side surface. Hereby, the aberration generated by the first lens element can be corrected.

The third lens element may have positive refractive power and a convex image-side surface. Hereby, the positive refractive power of the first lens element nay be allocated so as to avoid the spherical aberration increasing overly, and the sensitivity of the optical image capturing system may be reduced.

The fourth lens element may have negative refractive power and a convex object-side surface. Hereby, the astigmatism is corrected to enable the image plane being more planar.

The fifth lens elements may have positive refractive power and may have at least on inflection point on at least one surface of the fifth lens element. Hereby, the incident angle of the fifth lens element in each viewing field may be effectively adjusted so as to improve the aberration.

The sixth lens element may have positive refractive power and at least one surface of the sixth lens element may have at least one inflection point. Hereby, the incident angle of the sixth lens element in each viewing field may be effectively adjusted so as to improve the aberration.

The seventh lens element may have negative refractive power and a concave image-side surface. Hereby, the back focal length is reduced for keeping the miniaturization, to miniaturize the lens element effectively. In addition, at least one of the object-side surface and the image-side surface of the seventh lens element may have at least one inflection point, such that the angle of incident with incoming light from an off-axis view field can be suppressed effectively and the aberration in the off-axis view field can be corrected further.

The optical image capturing system may further include an image sensing device which is disposed on an image plane. Half of a diagonal of an effective detection field of the image sensing device (i.e., imaging height or the maximum image height of the optical image capturing system) is HOI. A distance on the optical axis from the object-side surface of the first lens element to the image plane is HOS. The following relations are satisfied: HOS/HOI≤3 and 0.5≤HOS/f≤2.5. Preferably, the following relation may be satisfied: 1≤HOS/HOI≤2.5 and 1≤HOS/f≤2. Hereby, the miniaturization of the optical image capturing system can be maintained effectively, so as to be carried by lightweight portable electronic devices.

In addition, in the optical image capturing system of the disclosure, according to different requirements, at least one aperture stops may be arranged for reducing stray light and improving the image quality.

In the optical image capturing system of the disclosure, the aperture stop may be a front or middle aperture. The front aperture is the aperture stop between a photographed object and the first lens element. The middle aperture is the aperture stop between the first lens element and the image plane. If the aperture stop is the front aperture, a longer distance between the exit pupil and the image plane of the optical image capturing system can be formed, such that more optical elements can be disposed in the optical image capturing system and the effect of receiving images of the image sensing device can be raised. If the aperture stop is the middle aperture, the view angle of the optical image capturing system can be expended, such that the optical image capturing system has the same advantage that is owned by wide angle cameras. A distance from the aperture stop to the image plane is InS. The following relation is satisfied: 0.5≤InS/HOS≤1.1. Hereby, features of maintaining the minimization for the optical image capturing system and having wide-angle are available simultaneously.

In the optical image capturing system of the disclosure, a distance from the object-side surface of the first lens element to the image-side surface of the seventh lens element is InTL. A total central thickness of all lens elements with refractive power on the optical axis is ΣTP. The following relation is satisfied: 0.1≤ΣTP/InTL≤0.9. Hereby, contrast ratio for the image formation in the optical image capturing system and defect-free rate for manufacturing the lens element can be given consideration simultaneously, and a proper back focal length is provided to dispose others optical components in the optical image capturing system.

A curvature radius of the object-side surface of the first lens element is R1. A curvature radius of the image-side surface of the first lens element is R2. The following relation is satisfied: 0.01≤|R1/R2|<20. Hereby, the first lens element may have proper strength of the positive refractive power, so as to avoid the longitudinal spherical aberration to increase too fast. Preferably, the following relation may be satisfied: 0.05<|R1/R2|<0.3.

A curvature radius of the object-side surface of the seventh lens element is R13. A curvature radius of the image-side surface of the seventh lens element is R14. The following relation is satisfied: −7<(R13−R14)/(R13+R14)<2. Hereby, the astigmatic generated by the optical image capturing system can be corrected beneficially.

A distance between the first lens element and the second lens element on the optical axis is IN12. The following relation is satisfied: 0<IN12/f<0.2.

Central thicknesses of the first lens element and the second lens element on the optical axis are TP1 and TP2, respectively. The following relation is satisfied: 0.8≤(TP1+IN12)/TP2≤6.0. Hereby, the sensitivity produced by the optical image capturing system can be controlled, and the performance can be increased.

Central thicknesses of the sixth lens element and the seventh lens element on the optical axis are TP6 and TP7, respectively, and a distance between aforementioned two lens elements on the optical axis is IN67. The following relation is satisfied: 0.8 (TP7+IN67) /TP6≤3. Hereby, the sensitivity produced by the optical image capturing system can be controlled and the total height of the optical image capturing system can be reduced.

Central thicknesses of the third, fourth and fifth lens elements on the optical axis are TP3, TP4 and TP5, respectively, A distance between the third lens element and the fourth lens element on the optical axis is IN34 and a distance between the fourth lens element and the fifth lens element on the optical axis is IN45. A distance from the first lens element to the seventh lens element on the optical axis is InTL. The following relation is satisfied: 0.1≤(TP3+TP4+TP5)/ΣTP≤0.6. Hereby, the aberration generated by the process of moving the incident light can be adjusted slightly layer upon layer, and the total height of the optical image capturing system can be reduced.

A distance in parallel with an optical axis from a maximum effective half diameter on the object-side surface 172 of the seventh lens element to an axial point on the object-side surface 172 of the seventh lens element is InRS71 (the InRS71 is positive if the horizontal displacement is toward the image-side surface; or the InRS71 is negative if the horizontal displacement is toward the object-side surface). A distance in parallel with an optical axis from a maximum effective half diameter on the image-side surface 174 of the seventh lens element to an axial point on the image-side surface 174 of the first lens element is InRS72. A central thickness of the seventh lens element on the optical axis is TP7. The following relations are satisfied: −5 mm≤InRS71≤5 mm, −5 mm≤InRS72≤5 mm, 0 mm≤|InRS71|+|InRS72|≤10 mm, 0<|InRS71|/TP7≤10 and 0<|InRS72/TP7≤10. Hereby, a ratio (thickness rate) of the central thickness to the effective diameter of the first lens element can be controlled, so as to further improve defect-free rate for manufacturing the lens element. Preferably, the following relation is satisfied: 0.001 mm≤|InRS71|+|InRS72|≤5 mm. Hereby, a maximum effective half diameter between two surfaces of the seventh lens element may be controlled, and features of maintaining the minimization for the optical image capturing system and having wide-angle are available simultaneously.

In the optical image capturing system of the disclosure, a distance perpendicular to the optical axis between a critical point C71 on the image-side surface 172 of the seventh lens element and the optical axis is HVT71. A distance perpendicular to the optical axis between a critical point C72 on the object-side surface 174 of the seventh lens element and the optical axis is HVT72. A distance in parallel with the optical axis from an axial point on the image-side surface 172 of the seventh lens element to the critical point C71 is SGC71. A distance in parallel with the optical axis from an axial point on the object-side surface 174 of the seventh lens element to the critical point C72 is SGC72. The following relations are satisfied: 0 mm≤HVT71≤3 mm, 0 mm<HVT72≤6 mm, 0≤HVT71/HVT72, 0 mm≤|SGC71|≤0.5 mm, 0 mm<|SGC72|≥2 mm, and 0<|SGC72|/(|SGC72|+TP7)≤0.9. Hereby, the aberration of the off-axis view field can be corrected effectively.

The following relation is satisfied for the optical image capturing system of the disclosure: 0.2≤HVT72/HOI≤0.9. Preferably, the following relation may be satisfied: 0.3≤HVT72/HOI≤0.8. Hereby, the aberration of surrounding view field for the optical image capturing system can be corrected beneficially.

The following relation is satisfied for the optical image capturing system of the disclosure: 0≤HVT72/HOS≤0.5. Preferably, the following relation may be satisfied:

0.2≤HVT72/HOS≤0.45. Hereby, the aberration of surrounding view field for the optical image capturing system can be corrected beneficially.

In the optical image capturing system of the disclosure, a distance in parallel with an optical axis from an inflection point on the object-side surface of the seventh lens element which is nearest to the optical axis to an axial point on the object-side surface of the seventh lens element is denoted by SGI711. A distance in parallel with an optical axis from an inflection point on the image-side surface of the seventh lens element which is nearest to the optical axis to an axial point on the image-side surface of the seventh lens element is denoted by SGI721. The following relations are satisfied: 0<SGI711/(SGI711+TP7)≤0.9, 0<SGI721/(SGI721+TP7)≤0.9. Preferably, following relations are satisfied: 0.1≤SGI711/(SGI711+TP7)≤0.6, 0.1≤SGI721/(SGI721+TP7)≤0.6.

A distance in parallel with an optical axis from an inflection point on the object-side surface of the seventh lens element which is a second nearest point to the optical axis to an axial point on the object-side surface of the seventh lens element is denoted by SGI712. A distance in parallel with an optical axis from an inflection point on the image-side surface of the seventh lens element which is a second nearest point to the optical axis to an axial point on the image-side surface of the seventh lens element is denoted by SGI722. The following relations are satisfied: 0<SGI712/(SGI712+TP7)≤0.9, 0<SGI722/(SGI722+TP7)≤0.9. Preferably, following relations are satisfied: 0.1≤SGI712/(SGI712+TP7)≤0.6, 0.1≤SGI722/(SGI722+TP7)≤0.6.

A distance perpendicular to the optical axis between the inflection point on the object-side surface of the seventh lens element which is nearest to the optical axis and the optical axis is denoted by HIF711. A distance perpendicular to the optical axis between an axial point on the image-side surface of the seventh lens element and an inflection point on the image-side surface of the second lens element which is nearest to the optical axis is denoted by HIF721. The following relations are satisfied: 0.001 mm≤|HIF711|≤5 mm, 0.001 mm≤|HIF721|≤5 mm. Preferably, the following relations are satisfied: 0.1 mm≤|HIF711|≤3.5 mm, 1.5 mm≤|HIF721|≤3.5 mm.

A distance perpendicular to the optical axis between the inflection point on the object-side surface of the seventh lens element which is a second nearest point to the optical axis and the optical axis is denoted by HIF712. A distance perpendicular to the optical axis between an axial point on the image-side surface of the seventh lens element and an inflection point on the image-side surface of the second lens element which is a second nearest point to the optical axis is denoted by HIF722. The following relations are satisfied: 0.001 mm≤|HIF712|≤5 mm, 0.001 mm≤|HIF722|≤5 mm. Preferably, the following relations are satisfied: 0.1 mm≤|HIF722|≤3.5 mm, 0.1 mm≤|HIF712|≤3.5 mm.

One embodiment of the optical image capturing system disclosed in the present invention is able to correct the aberration by crossing the lens elements having the high dispersion coefficient and the low dispersion coefficient The above Aspheric formula is: $z=ch^2/[1+[1-(k+1)c^2h^2]^{0.5}]+A4h^4+A6h^6+A8h^8+A10h^{10}+A12h^{12}+A14h^{14}+A16h^{16}+A18h^{18}+A20h^{20}+\ldots$, where z is a position value of the position along the optical axis and at the height h which reference to the surface apex; k is the conic coefficient, c is the reciprocal of curvature radius and A4, A6, A8, A10, A12, A14, A16, A18, and A20 are high order aspheric coefficients.

The optical image capturing system provided by the disclosure, the lens elements may be made of glass or plastic material. If plastic material is adopted to produce the lens elements, the cost of manufacturing and the weight will be lowered effectively. If lens elements are made of glass, the heat effect can be controlled and the designed space arranged for the refractive power of the optical image capturing system can be increased. Besides, the object-side surface and the image-side surface of the first through seventh lens elements may be aspheric, so as to obtain more control variables. Comparing with the usage of traditional lens element made by glass, the number of using lens elements can be reduced and the aberration can be eliminated. Therefore, the total height of the optical image capturing system can be reduced effectively.

In addition, in the optical image capturing system provided of the disclosure, the lens element has a convex surface if the surface of the lens element is convex in proximity to the optical axis. The lens element has a concave surface if the surface of the lens element is concave in proximity to the optical axis.

In addition, in the optical image capturing system provided of the disclosure, at least one light diaphragm is disposed to reduce the stray light, such that the image quality is promoted.

The optical image capturing system of the disclosure can be adapted to the optical image capturing system with automatic focus if required. With the features of a good aberration correction and a high quality of image formation, the optical image capturing system can be used in various application fields.

According to the above embodiments, the specific embodiments with figures are presented in detailed as below.

The First Embodiment (Embodiment 1)

Figure 1B:
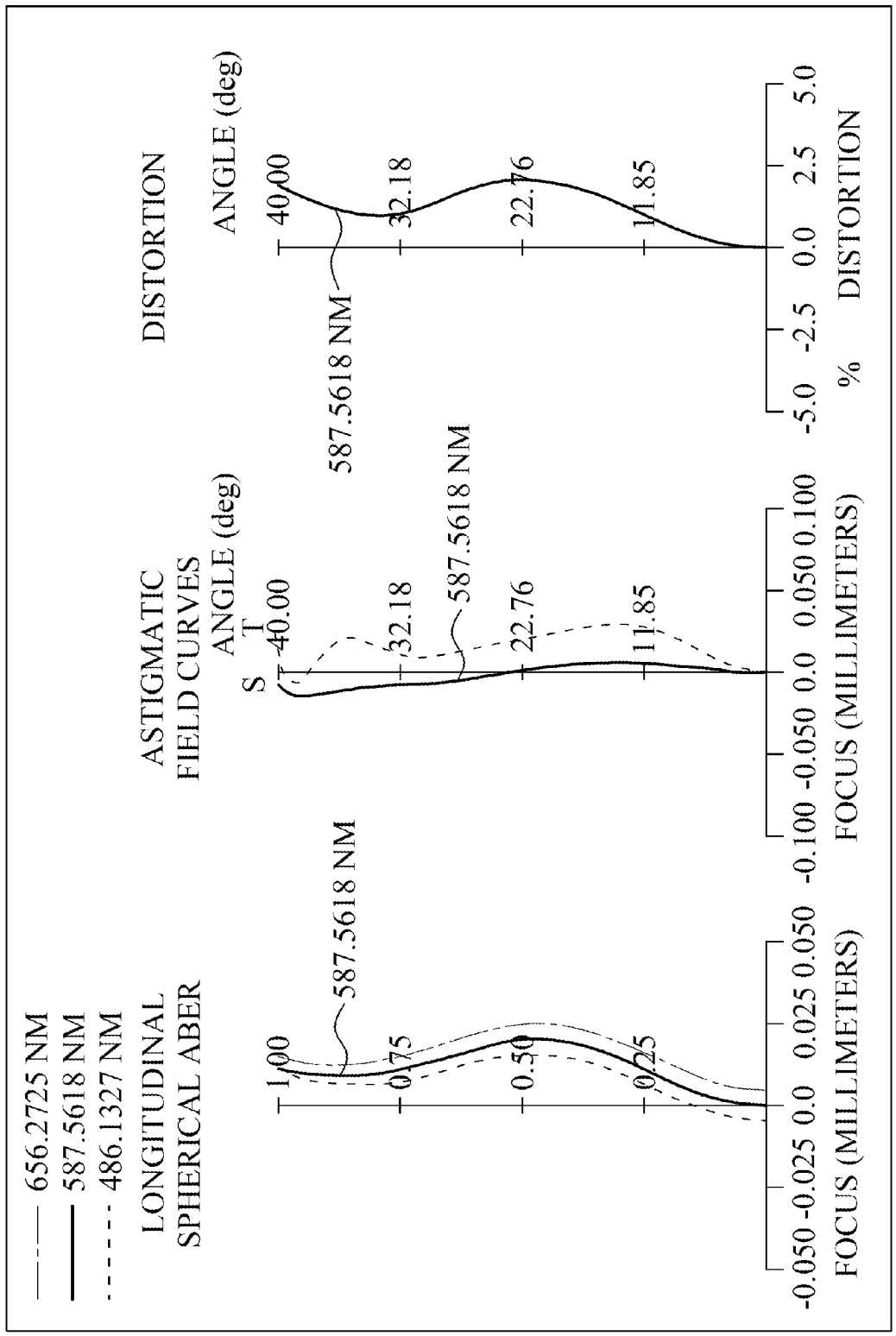
FIG. 1B is longitudinal spherical aberration curves, astigmatic field curves, and an optical distortion grid of the optical image capturing system in the order from left to right according to the first embodiment of the present application.
Figure 1C:
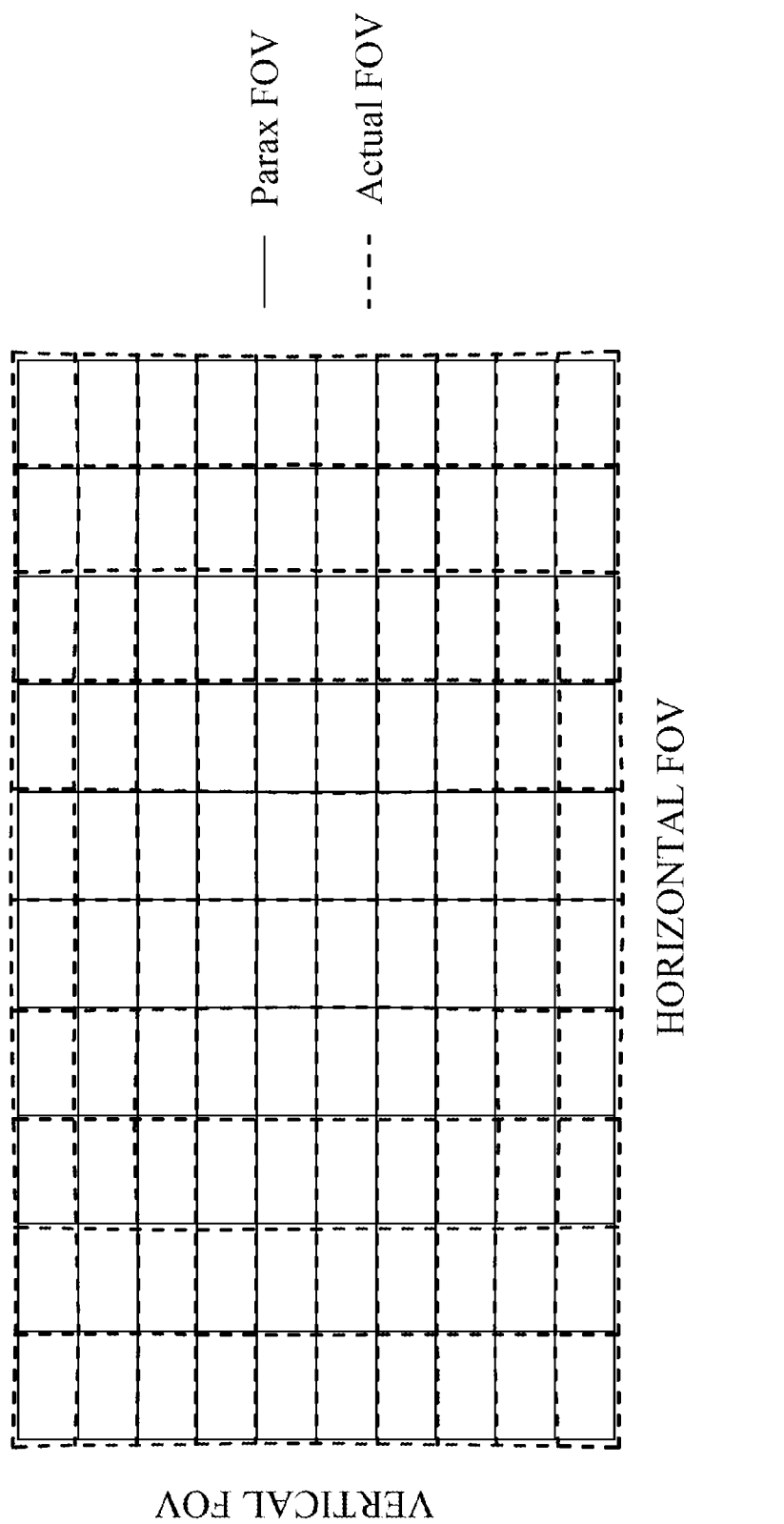
FIG. 1C is a TV distortion grid of the optical image capturing system according to the first embodiment of the present application.

Please refer to FIGS. 1A and FIG. 1B and FIG. 1C, FIG. 1A is a schematic view of the optical image capturing system according to the first embodiment of the present application, FIG. 1B is longitudinal spherical aberration curves, astigmatic field curves, and an optical distortion curve of the optical image capturing system in the order from left to right according to the first embodiment of the present application, and FIG. 1C is a TV distortion grid of the optical image capturing system according to the first embodiment of the present application. As shown in FIG. 1A, sequentially arranged from an object side to an image side, the optical image capturing system includes a first lens element 110, an aperture stop 100, a second lens element 120, a third lens element 130, a fourth lens element 140, a fifth lens element 150, a sixth lens element 160, a seventh lens element 170, an IR filter 180, an image plane 190 and an image sensing member 192.

The first lens element 110 has positive refractive power and it is made of plastic material. The first lens element 110 has a convex object-side surface 112 and a concave image-side surface 114; both of the object-side surface 112 and the image-side surface 114 are aspheric.

The second lens element 120 has negative refractive power and it is made of plastic material. The second lens element 120 has a convex object-side surface 122 and a concave image-side surface 124 and both of the object-side surface 122 and the image-side surface 124 are aspheric and the concave image-side surface 124 has one inflection point. A distance in parallel with an optical axis from an inflection point on the object-side surface of the second lens element which is nearest to the optical axis to an axial point on the object-side surface of the second lens element is denoted by SGI211. A distance in parallel with an optical axis from an inflection point on the image-side surface of the second lens element which is nearest to the optical axis to an axial point on the image-side surface of the second lens element is denoted by SGI221. The following relations are satisfied: SGI221=0.14138 mm, TP2=0.23 mm and |SGI221|/(|SGI221|+TP2)=0.38069.

A distance perpendicular to the optical axis between the inflection point on the object-side surface of the second lens element which is nearest to the optical axis and the optical axis is denoted by HIF211. A distance perpendicular to the optical axis between an axial point on the image-side surface of the second lens element and an inflection point on the image-side surface of the second lens element which is nearest to the optical axis is denoted by HIF221. The following relations are satisfied: HIF221=1.15809 mm and HIF221/HOI=0.29596.

The third lens element 130 has negative refractive power and it is made of plastic material. The third lens element 130 has a concave object-side surface 132 and a convex image-side surface 134 and both of the object-side surface 132 and the image-side surface 134 are aspheric. The image-side surface 134 has two inflection points. A distance in parallel with an optical axis from an inflection point on the object-side surface of the third lens element which is nearest to the optical axis to an axial point on the object-side surface of the third lens element is denoted by SGI311. A distance in parallel with an optical axis from an inflection point on the image-side surface of the third lens element which is nearest to the optical axis to an axial point on the image-side surface of the third lens element is denoted by SGI321. The following relations are satisfied: SGI321=0.00124 mm and |SGI321|/(|SGI321|+TP3)=0.00536.

A distance in parallel with an optical axis from an inflection point on the object-side surface of the third lens element which is a second nearest point to the optical axis to an axial point on the object-side surface of the third lens element is denoted by SGI312. A distance in parallel with an optical axis from an inflection point on the object-side surface of the third lens element which is a second nearest point to the optical axis to an axial point on the object-side surface of the third lens element is denoted by SGI312. The following relations are satisfied: SGI322=0.00103 mm and |SGI322|/(|SGI322|+TP3)=0.00445.

A distance perpendicular to the optical axis between the inflection point on the object-side surface of the third lens element which is nearest to the optical axis and the optical axis is denoted by HIF311. A distance perpendicular to the optical axis between the inflection point on the image-side surface of the third lens element which is nearest to the optical axis and the optical axis is denoted by HIF321. The following relations are satisfied: HIF321=0.37528 mm and HIF321/HOI=0.09591.

A distance perpendicular to the optical axis from an inflection point on the object-side surface of the third lens element which is a second nearest point to the optical axis to the optical axis is denoted by HII312. A distance perpendicular to the optical axis from an inflection point on the image-side surface of the third lens element which is a second nearest point to the optical axis to the optical axis is denoted by HII322. The following relations are satisfied: HIF322=0.92547 mm and HIF322/HOI=0.23651.

The fourth lens element 140 has positive refractive power and it is made of plastic material. The fourth lens element 140 has a convex object-side surface 142 and a convex image-side surface 144; both of the object-side surface 142 and the image-side surface 144 are aspheric. The object-side surface 142 has two inflection points. A distance in parallel with an optical axis from an inflection point on the object-side surface of the fourth lens element which is nearest to the optical axis to an axial point on the object-side surface of the fourth lens element is denoted by SGI411. A distance in parallel with an optical axis from an inflection point on the image-side surface of the fourth lens element which is nearest to the optical axis to an axial point on the image-side surface of the fourth lens element is denoted by SGI421. The following relations are satisfied: SGI411=0.01264 mm and |SGI411|/(|SGI411|+TP4)=0.02215.

A distance in parallel with an optical axis from an inflection point on the object-side surface of the fourth lens element which is a second nearest point to the optical axis to an axial point on the object-side surface of the fourth lens element is denoted by SGI412. A distance in parallel with an optical axis from an inflection point on the image-side surface of the fourth lens element which is a second nearest point to the optical axis to an axial point on the object-side surface of the fourth lens element is denoted by SGI422. The following relations are satisfied: SGI412=0.02343 mm and |SGI412|/(|SGI412|+TP4)=0.04032.

A distance perpendicular to the optical axis between the inflection point on the object-side surface of the fourth lens element which is nearest to the optical axis and the optical axis is denoted by HIF411. A distance perpendicular to the optical axis between an axial point on the image-side surface of the fourth lens element and an inflection point on the image-side surface of the fourth lens element which is nearest to the optical axis is denoted by HIF421. The following relations are satisfied: HIF411=0.63515 mm and HIF411/HOI=0.16232.

A distance perpendicular to the optical axis between an inflection point on the object-side surface of the fourth lens element which is a second nearest point to the optical axis and the optical axis is denoted by HIF412. A distance perpendicular to the optical axis between an inflection point on the image-side surface of the fourth lens element which is a second nearest point to the optical axis and the optical axis is denoted by HIF422. The following relations are satisfied: HIF412=1.33003 mm and HIF412/HOI=0.33990.

The fifth lens element 150 has positive refractive power and it is made of plastic material. The fifth lens element 150 has a convex object-side surface 152 and a concave image-side surface 154; both of the object-side surface 152 and the image-side surface 154 are aspheric and have two inflection points. A distance in parallel with an optical axis from an inflection point on the object-side surface of the fifth lens element which is nearest to the optical axis to an axial point on the object-side surface of the fifth lens element is denoted by SGI511. A distance in parallel with an optical axis from an inflection point on the image-side surface of the fifth lens element which is nearest to the optical axis to an axial point on the image-side surface of the fifth lens element is denoted by SGI521. The following relations are satisfied: SGI511=0.02069 mm, SGI521=0.00984 mm, |SGI511|/(|SGI511|+TP5)=0.07040 and |SGI521|/(|SGI521|+TP5)=0.03479.

A distance in parallel with an optical axis from an inflection point on the object-side surface of the fifth lens element which is a second nearest point to the optical axis to an axial point on the object-side surface of the fifth lens element is denoted by SGI512. A distance in parallel with an optical axis from an inflection point on the image-side surface of the fifth lens element which is a second nearest point to the optical axis to an axial point on the image-side surface of the fifth lens element is denoted by SGI522. The following relations are satisfied: SGI512=−0.17881 mm, SGI522=−0.21283 mm, |SGI512|/(|SGI512|+TP5)=1.89553 and |SGI522|/(|SGI522|+TP5)=3.52847.

A distance perpendicular to the optical axis between the inflection point on the object-side surface of the fifth lens element which is nearest to the optical axis and the optical axis is denoted by HIF511. A distance perpendicular to the optical axis between an axial point on the image-side surface of the fifth lens element and an inflection point on the image-side surface of the fifth lens element which is nearest to the optical axis is denoted by HIF521. The following relations are satisfied: HIF511=0.54561 mm, HIF521=0.45768 mm, HIF511/HOI=0.13944 and HIF521/HOI=0.11696.

A distance perpendicular to the optical axis between an inflection point on the object-side surface of the fifth lens element which is a second nearest point to the optical axis and the optical axis is denoted by HIF512. A distance perpendicular to the optical axis between an inflection point on the image-side surface of the fifth lens element which is a second nearest point to the optical axis and the optical axis is denoted by HIF522. The following relations are satisfied: HIF512=1.6428 mm, HIF522=1.66808 mm, HIF512/HOI=0.41983 and HIF522/HOI=0.42629.

The sixth lens element 160 has positive refractive power and it is made of plastic material. The sixth lens element 160 has a convex object-side surface 162 and a convex image-side surface 164, and the object-side surface 162 has at least one inflection point. Hereby, angles of the aberration in each viewing field can be effectively adjusted. A distance in parallel with an optical axis from an inflection point on the object-side surface of the sixth lens element which is nearest to the optical axis to an axial point on the object-side surface of the sixth lens element is denoted by SGI611. A distance in parallel with an optical axis from an inflection point on the image-side surface of the sixth lens element which is nearest to the optical axis to an axial point on the image-side surface of the sixth lens element is denoted by SGI621. The following relations are satisfied: SGI611=0.03349 mm and |SGI611|/(|SGI611|+TP6)=0.03224.

A distance perpendicular to the optical axis between the inflection point on the object-side surface of the sixth lens element which is nearest to the optical axis and the optical axis is denoted by HIF611. A distance perpendicular to the optical axis between an axial point on the image-side surface of the sixth lens element and an inflection point on the image-side surface of the fifth lens element which is nearest to the optical axis is denoted by HIF621. The following relations are satisfied: HIF611=0.78135 mm and HIF611/HOI=0.19968.

The seventh lens element 170 has negative refractive power and it is made of plastic material. The seventh lens element 170 has a concave object-side surface 172 and a concave image-side surface 174. Hereby, the shortened focal length can be minimized beneficially. In addition, the image-side surface 174 has one inflection point. A distance in parallel with an optical axis from an inflection point on the object-side surface of the seventh lens element which is nearest to the optical axis to an axial point on the object-side surface of the sixth lens element is denoted by SGI711. A distance in parallel with an optical axis from an inflection point on the image-side surface of the sixth lens element which is nearest to the optical axis to an axial point on the image-side surface of the seventh lens element is denoted by SGI721. The following relations are satisfied: SGI721=0.02449 mm and |SGI721|/(|SGI721|+TP7)=0.08004.

A distance perpendicular to the optical axis between the inflection point on the object-side surface of the seventh lens element which is nearest to the optical axis and the optical axis is denoted by HIF711. A distance perpendicular to the optical axis between an axial point on the image-side surface of the seventh lens element and an inflection point on the image-side surface of the fifth lens element which is nearest to the optical axis is denoted by HIF721. The following relations are satisfied: HIF721=0.71190 mm and HIF721/H0I=0.18193.

The embodiment and the following related features of the inflection point are mainly obtained by the reference wavelength 555 nm.

The angle of the off-axis viewing field can be effectively suppressed and the aberration of the off-axis viewing field can be further corrected.

The IR filter 180 is made of glass material without affecting the focal length of the optical image capturing system and it is disposed between the seventh lens element 170 and the image plane 190 without affecting the focal length of the optical image capturing system.

In the first embodiment of the optical image capturing system, a focal length of the optical image capturing system is f, an entrance pupil diameter of the optical image capturing system is HEP. Half of a maximal view angle of the optical image capturing system is HAF. The detailed parameters are shown as below: f=4.5707 mm, f/HEP=1.8, HAF=40 and tan (HAF)=0.8390.

In the first embodiment of the optical image capturing system, a focal length of the first lens element 110 is f1 and a focal length of the seventh lens element 170 is f7. The following relations are satisfied: f1=4.4284 mm, |f/f1|=1.03; f7=−2.8334, |f1|>f7 and |f1/f7|=1.56.

In the first embodiment of the optical image capturing system, focal lengths from the second lens element 120 to the sixth lens element 160 are f2, f3, f4, f5 and f6, respectively. The following relations are satisfied: |f2|+|f3|+|f4|+|f5|+|f6|=90.6484, |f1|+|f7|=7.2618 and |f2|+|f3|+|f4|+|f5|+|f6|>|f1|+|f7|.

A ratio of the focal length f of the optical image capturing system to a focal length fp of each of lens elements with positive refractive power is PPR. A ratio of the focal length f of the optical image capturing system to a focal length fn of each of lens elements with negative refractive power is NPR. A sum of the PPR of all lens elements with positive refractive power is ΣPPR=f/f1+f/f4+f/f5+f/f6=2.40. A sum of the NPR of all lens elements with negative refractive powers is ΣNPR=f/f2+f/f3+f/f7=−2.26, ΣPPR/|ΣNPR|=1.07. The following relations are satisfied: |f/f2|=0.44; |f/f3|=0.19, |f/f4|=0.22; |f/f5|=0.15, |f/f6|=0.996, |f/f7|=1.62.

In the first embodiment of the optical image capturing system, a distance from the object-side surface 112 of the first lens element to the image-side surface 174 of the seventh lens element is InTL. A distance from the object-side surface 112 of the first lens element to the image plane 190 is HOS. A distance from an aperture stop 100 (aperture) to an image plane 180 of the optical image capturing system is denoted by InS. Half of a diagonal of an effective detection field of the image sensing device is HOI. A distance between the image-side surface 174 of the seventh lens element and the image plane 190 is BFL. The following relations are satisfied: InTL+BFL=HOS, HOS=6.0044 mm, HOI=3.8353 mm, HOS/HOI=5.2257, HOS/f=1.3137, InS=5.2899 mm and InS/HOS=0.8810.

In the first embodiment of the optical image capturing system, a total central thickness of all lens elements with refractive power on the optical axis is ΣTP. The following relations are satisfied: ΣTP=3.2467 mm and ΣTP/InTL=0.6088. Hereby, the contrast ratio of the optical image capturing system and the yield ration of manufacturing the lens elements are able to be concerned, and an adequate rear focal length is provided to accommodate the other elements.

In the first embodiment of the optical image capturing system, a curvature radius of the object-side surface 112 of the first lens element is R1. A curvature radius of the image-side surface 114 of the first lens element is R2. The following relation is satisfied: |R1/R2|=0.0861. Hereby, the first lens element has adequate strength of positive refractive power to avoid the spherical aberration increasing too fast.

In the first embodiment of the optical image capturing system, a curvature radius of the object-side surface 172 of the seventh lens element is R13. A curvature radius of the image-side surface 174 of the seventh lens element is R14. The following relation is satisfied: (R13−R14)/(R13+R14)=−1.5469. Hereby, the distortion caused in the optical image capturing system can be corrected.

In the first embodiment of the optical image capturing system, focal length of the first lens element 110, the fourth lens element 140, the fifth lens element 150 and the sixth lens element 160 on the optical axis are f1, f4, f5 and f6, respectively. A sum of the focal length of all the lens elements having positive refractive power is ΣPP. The following relations are satisfied: ΣPP=f1+f4+f5+f6=60.2624 mm, and f1/(f1+f4+f5+f6)=0.0731. Hereby, it's favorable for allocating the positive refractive power of the first lens element 110 to others positive lens elements and the significant aberrations generated in the process of moving the incident light can be suppressed.

In the first embodiment of the optical image capturing system, focal length of the second lens element 120, the third lens element 130 and the seventh lens element 170 are f2, f3 and f7, respectively. A sum of the focal length of all the lens elements having negative refractive power is ΣNP. The following relations are satisfied: ΣNP=f2+f3+f7=−36.8510 mm and f7/(f2+f3+f7)=0.0765. Hereby, it's favorable for allocating the negative refractive power of the seventh lens element 170 to others negative lens elements and the significant aberrations generated in the process of moving the incident light can be suppressed.

In the first embodiment of the optical image capturing system, a distance between the first lens element 110 and the second lens element 120 on the optical axis is IN12. The following relations are satisfied: IN12=0.1352 mm and IN12/f=0.0296. Hereby, the chromatic aberration of the lens elements can be improved, such that the performance can be increased.

In the first embodiment of the optical image capturing system, central thicknesses of the first lens element 110 and the second lens element 120 on the optical axis are TP1 and TP2, respectively. The following relations are satisfied: TP1=0.6689 mm, TP2=0.23 mm and (TP1+IN12)/TP2=3.4961. Hereby, the sensitivity produced by the optical image capturing system can be controlled, and the performance can be increased.

In the first embodiment of the optical image capturing system, central thicknesses of the sixth lens element 160 and the seventh lens element 170 on the optical axis are TP6 and TP7, respectively and a distance between aforementioned two lens elements on the optical axis is IN67. The following relations are satisfied: TP6=1.0055 mm, TP7=0.2814 mm and (TP7+IN67)/TP6=1.1176. Hereby, the sensitivity produced by the optical image capturing system can be controlled and the total height of the optical image capturing system can be reduced.

In the first embodiment of the optical image capturing system, central thicknesses of the third lens element 130, the fourth lens element 140 and the fifth lens element 150 on the optical axis are TP3, TP4 and TP5, respectively. A distance between the third lens element 130 and the fourth lens element 140 on the optical axis is IN34 and a distance between the fourth lens element 140 and the fifth lens element 150 on the optical axis is IN45. A distance from the object-side surface 112 of the first lens element to the image-side surface 174 of the seventh lens element is InTL. The following relations are satisfied: TP3=0.23 mm, TP4=0.5578 mm, TP5=0.2731 mm and (TP3+TP4+TP5)/ΣTP=0.3268. Hereby, the sensitivity produced by the optical image capturing system can be controlled and the total height of the optical image capturing system can be reduced.

In the first embodiment of the optical image capturing system, a distance in parallel with an optical axis from a maximum effective half diameter on the object-side surface 162 of the sixth lens element to an axial point on the object-side surface 164 of the sixth lens element is InRS61. A distance in parallel with an optical axis from a maximum effective half diameter on the image-side surface 164 of the sixth lens element to an axial point on the image-side surface 164 of the sixth lens element is InRS62. A central thickness of the sixth lens element 160 on the optical axis is TP6. The following relations are satisfied: InRS61=−0.3725 mm, InRS62=−1.0961 mm and |InRS62|/TP6=1.0901. Hereby, a ratio (thickness rate) of the central thickness to the effective diameter of the first lens element 110 can be controlled, so as to further improve defect-free rate for manufacturing the lens element.

In the first embodiment of the optical image capturing system, a distance perpendicular to the optical axis between a critical point on the object-side surface 162 of the sixth lens element and the optical axis is HVT61. A distance perpendicular to the optical axis between a critical point on the image-side surface 164 of the sixth lens element and the optical axis is HVT62. The following relations are satisfied: HVT61=1.2142 mm, HVT62=0 mm and HVT61/HVT62=0.

In the first embodiment of the optical image capturing system, a distance parallel in parallel with an optical axis from the object-side 162 of the sixth lens element to the inflection point of the object-side 162 of the sixth lens element is Inf61. A distance parallel in parallel with an optical axis from the image-side 164 of the sixth lens element to the inflection point of the image-side 164 of the sixth lens element is Inf62. The following relations are satisfied: Inf61=0.0551 mm, Inf62=0 mm and HVT62/(Inf62+CT6)=0.

In the first embodiment of the optical image capturing system, a distance in parallel with an optical axis from a maximum effective half diameter on the object-side surface 172 of the seventh lens element to an axial point on the object-side surface 172 of the second lens element is InRS71. A distance in parallel with an optical axis from a maximum effective half diameter on the image-side surface 174 of the seventh lens element to an axial point on the image-side surface 174 of the seventh lens element is InRS72. A central thickness of the seventh lens element 170 on the optical axis is TP7. The following relations are satisfied: InRS71=−1.851 mm; InRS72=−1.0045 mm and |InRS72|/TP7=3.5697. Hereby a ratio (thickness rate) of the central thickness to the effective diameter of the second lens element 120 can be controlled, so as to further improve defect-free rate for manufacturing the lens element.

In the first embodiment of the optical image capturing system, a distance perpendicular to the optical axis between a critical point on the object-side surface 172 of the seventh lens element and the optical axis is HVT71. A distance perpendicular to the optical axis between a critical point on the image-side surface 174 of the seventh lens element and the optical axis is HVT72. The following relations are satisfied: HVT71=0 mm, HVT72=1.2674 mm and HVT71/HVT72=0. Hereby, the ability of correcting the aberration of the off-axis view field can be given consideration.

In the first embodiment of the optical image capturing system, the following relation is satisfied: HVT72/HOI=0.3305. Hereby, the aberration of surrounding view field for the optical image capturing system can be corrected beneficially.

In the first embodiment of the optical image capturing system, the following relation is satisfied: HVT72/HOS=0.2111. Hereby, the aberration of surrounding view field for the optical image capturing system can be corrected beneficially.

In the first embodiment of the optical image capturing system, a distance parallel in parallel with an optical axis from the object-side 172 of the seventh lens element to the inflection point of the object-side 172 of the seventh lens element is Inf71. A distance parallel in parallel with an optical axis from the image-side 174 of the seventh lens element to the inflection point of the image-side 174 of the seventh lens element is Inf72. The following relations are satisfied: Inf71=0 mm, Inf72=0.0451 mm and HVT72/(Inf72+CT7)=3.8818.

In the first embodiment of the optical image capturing system, the following relation is satisfied: |InRS62|+|InRS71|=2.9471 mm. Hereby, the maximum effective half diameter of the sixth lens element 160 and the seventh lens element 170 can be effectively controlled and it's favorable for manufacturing and forming the lens element and for maintaining the minimization for the optical image capturing system.

In the first embodiment of the optical image capturing system, the following relation is satisfied: Inf72/|InRS72|=0.0449. Hereby, the maximum effective half diameter and the inflection pint of the image-side surface of the seventh lens element 174 can be controlled and it's favorable for manufacturing and forming the lens element and for maintaining the minimization for the optical image capturing system.

In the first embodiment of the optical image capturing system, the second lens element 120, the third lens element 130 and the seventh lens element 170 have negative refractive power. An Abbe number of the second lens element is NA2, an Abbe number of the third lens element is NA3 and an Abbe number of the seventh lens element is NA7. The following relation is satisfied: 1≤NA7/NA2. Hereby, the aberration of the optical image capturing system can be corrected beneficially.

In the first embodiment of the optical image capturing system, TV distortion and optical distortion for image formation in the optical image capturing system are TDT and ODT, respectively. The following relations are satisfied: |TDT|=0.94% and |ODT|=1.9599%.

Please refer to the following Table 1 and Table 2.
The detailed data of the optical image capturing system of the first embodiment is as shown in Table 1.

TABLE 1

Data of the optical image capturing system
f = 4.5707 mm, f/HEP = 1.8, HAF = 40 deg

| Surface # | | Curvature Radius | Thickness | Material | Index | Abbe # | Focal length |
|---|---|---|---|---|---|---|---|
| 0 | Object | Plano | Plano | | | | |
| 1 | Lens 1 | 2.29712 | 0.668946 | Plastic | 1.565 | 58 | 4.405 |
| 2 | | 26.68297 | 0.045368 | | | | |
| 3 | Ape. stop | Plano | 0.089845 | | | | |
| 4 | Lens 2 | 13.65238 | 0.23 | Plastic | 1.65 | 21.4 | −10.384 |
| 5 | | 4.48669 | 0.358683 | | | | |
| 6 | Lens 3 | −22.8014 | 0.23 | Plastic | 1.65 | 21.4 | −23.649 |
| 7 | | 47.36599 | 0.054835 | | | | |
| 8 | Lens 4 | 13.20186 | 0.557788 | Plastic | 1.565 | 58 | 20.384 |
| 9 | | −88.8646 | 0.15197 | | | | |
| 10 | Lens 5 | 5.93232 | 0.273144 | Plastic | 1.565 | 58 | 30.886 |
| 11 | | 8.83826 | 0.542787 | | | | |
| 12 | Lens 6 | 7.94491 | 1.005484 | Plastic | 1.565 | 58 | 4.587 |
| 13 | | −3.67115 | 0.842285 | | | | |
| 14 | Lens 7 | −1.83128 | 0.281438 | Plastic | 1.565 | 58 | −2.818 |
| 15 | | 8.52815 | 0.2 | | | | |
| 16 | IR-bandstop filter | Plano | 0.2 | | 1.517 | 64.2 | |
| 17 | | Plano | 0.267427 | | | | |
| 18 | Image plane | Plano | | | | | |

Reference wavelength (d-line) = 587.5 nm

As for the parameters of the aspheric surfaces of the first embodiment, reference is made to Table 2.

TABLE 2

Aspheric Coefficients

| Surface # | 1 | 2 | 4 | 5 | 6 | 7 | 8 |
|---|---|---|---|---|---|---|---|
| k = | 0.41223 | 23.12364 | 41.72578 | 7.17837 | 49.99854 | −50.00000 | −36.62296 |
| A4 = | −2.71583E−03 | 1.12798E−02 | 2.61376E−03 | −1.30847E−02 | −2.29364E−02 | −1.22682E−02 | −1.46685E−02 |
| A6 = | 1.46922E−03 | −4.13663E−03 | −1.04751E−03 | −6.19251E−03 | −1.07500E−02 | −1.19599E−03 | 6.97097E−04 |
| A8 = | −1.16798E−03 | 2.64633E−03 | 1.64429E−03 | 3.31848E−03 | 1.74194E−03 | 2.58555E−03 | −7.00461E−05 |
| A10 = | 3.86338E−04 | −4.87913E−04 | 1.38781E−04 | −2.16169E−03 | −1.35269E−03 | 8.44094E−04 | 2.49597E−04 |
| A12 = | | | | | | | |
| A14 = | | | | | | | |

| Surface # | 9 | 10 | 11 | 12 | 13 | 14 | 15 |
|---|---|---|---|---|---|---|---|
| k | 50.00000 | −48.11219 | −49.99984 | −16.63997 | −2.21871 | −0.59182 | −38.73828 |
| A4 | −3.04263E−02 | −2.44747E−02 | −3.74075E−02 | −6.98486E−03 | 1.46247E−02 | 3.52383E−03 | −1.36118E−02 |
| A6 | −3.91762E−03 | −4.89633E−03 | 2.04344E−04 | −4.00620E−03 | −6.01684E−03 | −6.07710E−03 | −4.77797E−06 |
| A8 | −8.89754E−04 | −9.29273E−04 | −3.75360E−04 | −3.83899E−04 | −3.42351E−04 | 4.66383E−04 | 2.50062E−05 |
| A10 | −4.10632E−06 | −2.24070E−05 | −4.59214E−04 | −7.50806E−05 | 1.51881E−05 | 1.30961E−04 | 1.57226E−06 |
| A12 | | −3.81083E−04 | −7.68111E−05 | −5.94891E−06 | 1.57349E−06 | 9.98584E−06 | 4.62952E−08 |
| A14 | | 1.44730E−04 | 6.86388E−05 | −2.82154E−06 | 2.09638E−07 | −3.94438E−06 | −3.77857E−08 |

Table 1 is the detailed structure data to the first embodiment in FIG. 1A, the unit of the curvature radius, the thickness, the distance, and the focal length is millimeters (mm) Surfaces 0-16 illustrate the surfaces from the object side to the image plane in the optical image capturing system. Table 2 is the aspheric coefficients of the first embodiment, k is the conic coefficient in the aspheric surface formula, and A1-A14 is the first through twentieth order aspheric surface coefficients, respectively. Besides, the tables in following embodiments are referenced to the schematic view and the aberration graphs, respectively, and definitions of parameters in the tables are equal to those in the Table 1 and the Table 2, so the repetitious details need not be given here.

The Second Embodiment (Embodiment 2)

Figure 2A:
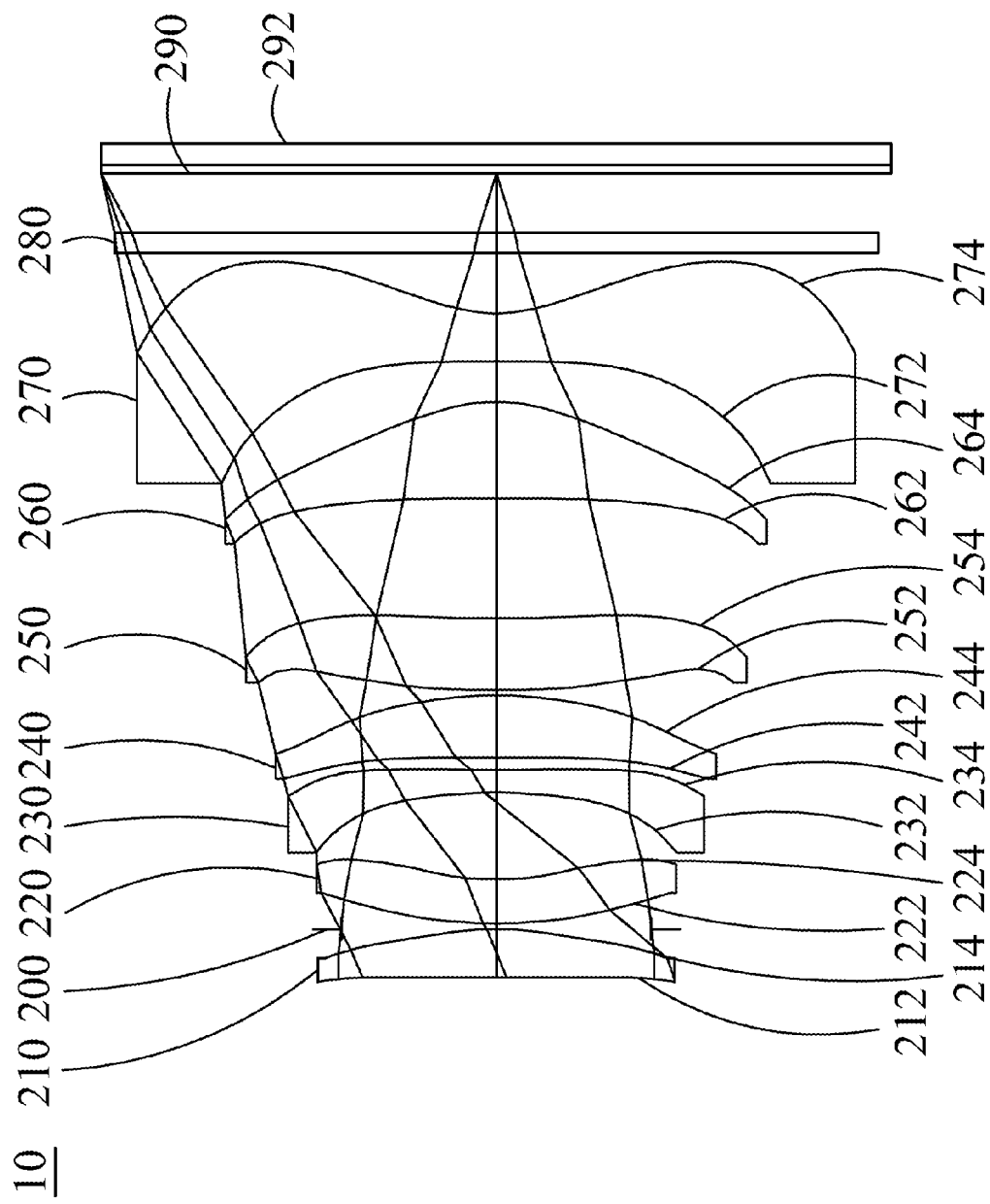
FIG. 2A is a schematic view of the optical image capturing system according to the second embodiment of the present application.
Figure 2B:
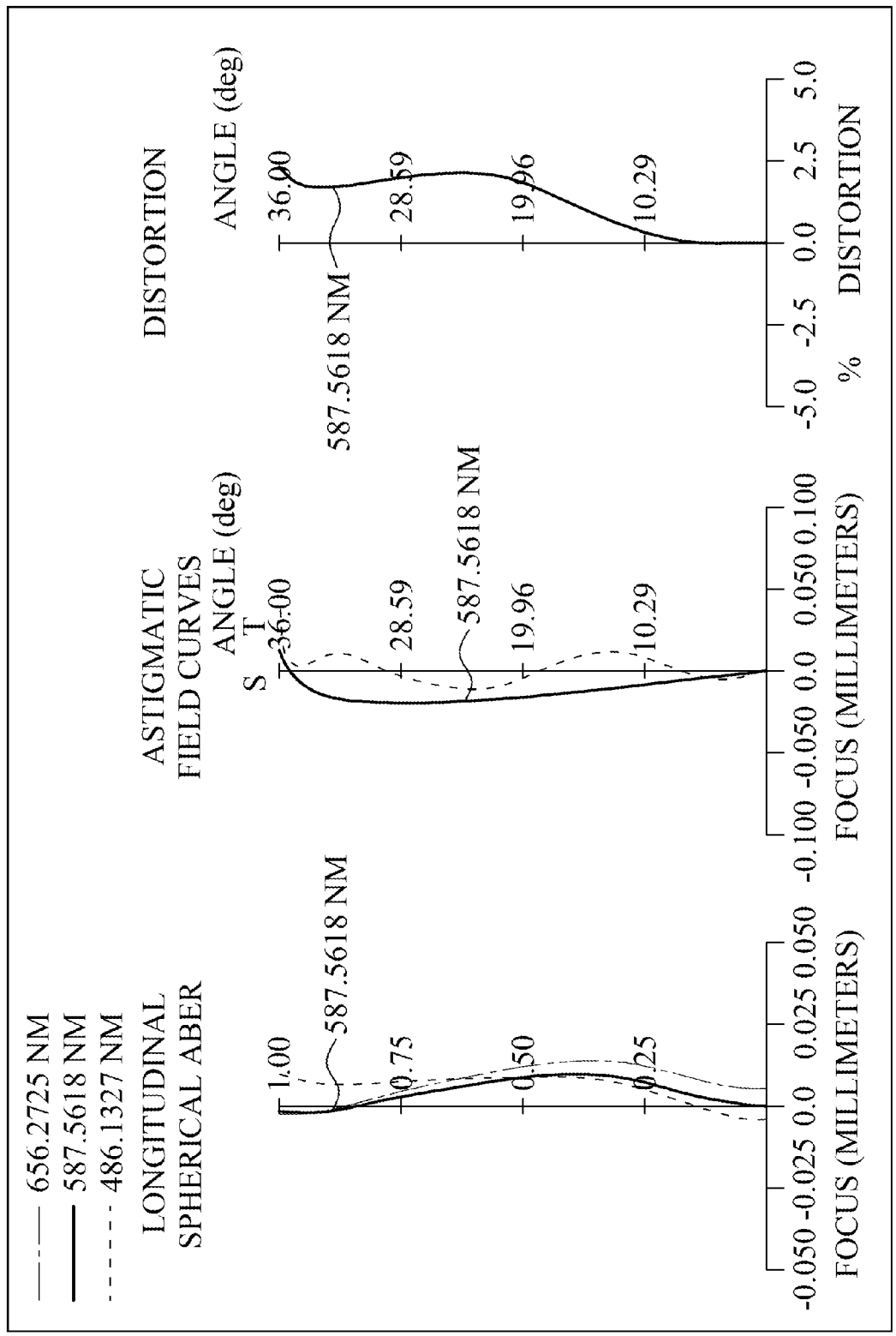
FIG. 2B is longitudinal spherical aberration curves, astigmatic field curves, and an optical distortion grid of the optical image capturing system in the order from left to right according to the second embodiment of the present application.
Figure 2C:
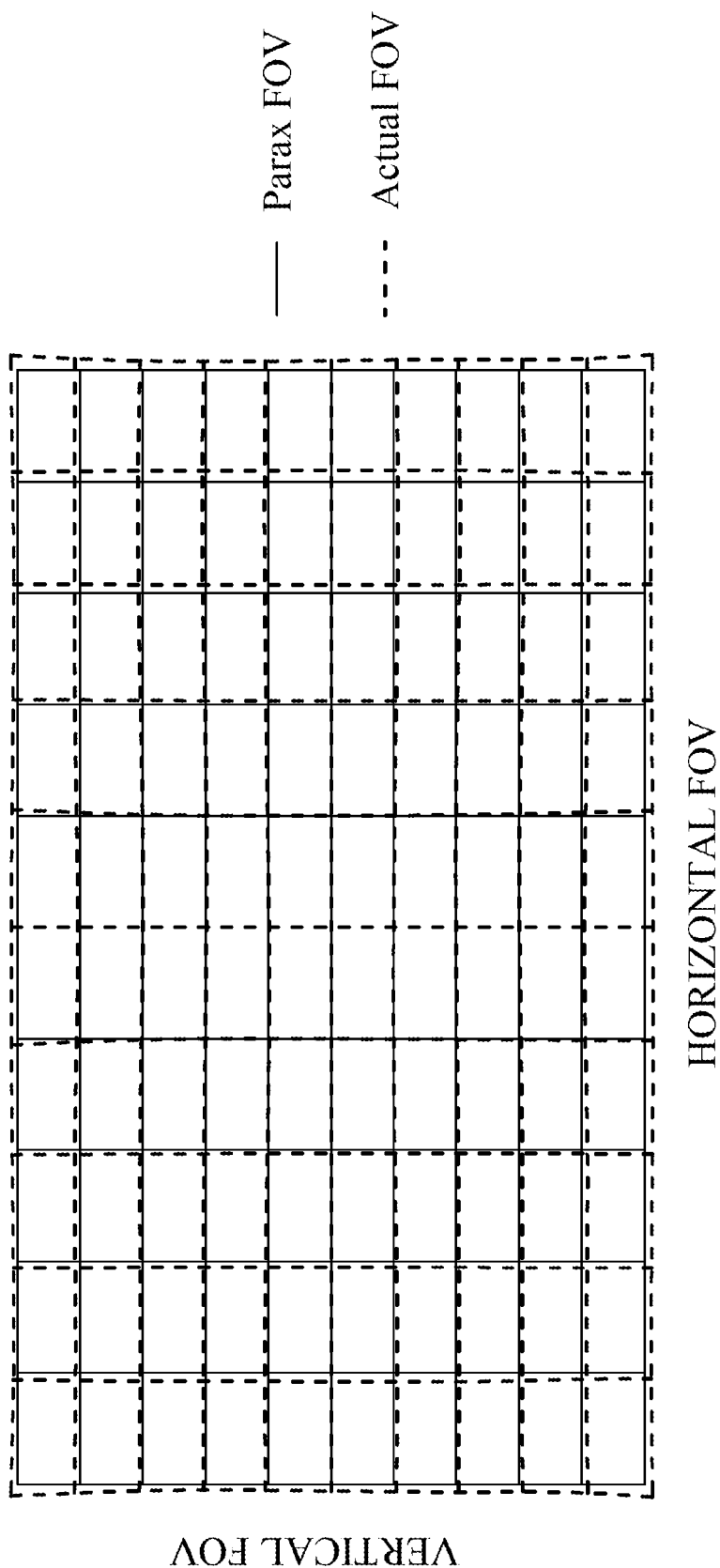
FIG. 2C is a TV distortion grid of the optical image capturing system according to the second embodiment of the present application.

Please refer to FIG. 2A, FIG. 2B, and FIG. 2C, FIG. 2A is a schematic view of the optical image capturing system according to the second embodiment of the present application, FIG. 2B is longitudinal spherical aberration curves, astigmatic field curves, and an optical distortion curve of the optical image capturing system in the order from left to right according to the second embodiment of the present application, and FIG. 2C is a TV distortion grid of the optical image capturing system according to the second embodiment of the present application. As shown in FIG. 2A, sequentially arranged from an object side to an image side, the optical image capturing system includes a first lens element 210, an aperture stop 200, a second lens element 220, a third lens element 230, a fourth lens element 240, a fifth lens element 250, a sixth lens element 260, a seventh lens element 270, an IR filter 280, an image plane 290, and an image sensing device 292.

The first lens element 210 has positive refractive power and it is made of plastic material. The first lens element 210 has a convex object-side surface 212 and a convex image-side surface 214, both of the object-side surface 212 and the image-side surface 214 are aspheric, and the object-side surface 212 has two inflection points and the image-side surface 214 has one inflection point.

The second lens element 220 has negative refractive power and it is made of plastic material. The second lens element 220 has a convex object-side surface 222 and a concave image-side surface 224; both of the object-side surface 222 and the image-side surface 224 are aspheric and the image-side surface 224 has one inflection point.

The third lens element 230 has negative refractive power and it is made of plastic material. The third lens element 230 has a concave object-side surface 232 and a concave image-side surface 234 and both of the object-side surface 232 and the image-side surface 234 are aspheric. The image-side surface 234 has one inflection point.

The fourth lens element 240 has positive refractive power and it is made of plastic material. The fourth lens element 240 has a concave object-side surface 242 and a convex image-side surface 244; both of the object-side surface 242 and the image-side surface 244 are aspheric and have one inflection point.

The fifth lens element 250 has positive refractive power and it is made of plastic material. The fifth lens element 250 has a convex object-side surface 252 and a concave image-side surface 254; both of the object-side surface 252 and the image-side surface 254 are aspheric and have an inflection point.

The sixth lens element 260 has positive refractive power and it is made of plastic material. The sixth lens element 260 has a concave object-side surface 262 and a convex image-side surface 264. Hereby, the incident angle of the sixth lens element in each viewing field may be effectively adjusted so as to improve the aberration.

The seventh lens element 270 has negative refractive power and it is made of plastic material. The seventh lens element 270 has a convex object-side surface 272 and a concave image-side surface 274. Hereby, the back focal length is reduced for keeping the miniaturization, to miniaturize the lens element effectively. In addition, the concave image-side surface 274 of the seventh lens element has one inflection point, such that the angle of incident with incoming light from an off-axis view field can be suppressed effectively and the aberration in the off-axis view field can be corrected further.

The IR filter 280 is made of glass material without affecting the focal length of the optical image capturing system and it is disposed between the seventh lens element 270 and the image plane 290 without affecting the focal length of the optical image capturing system.

In the second embodiment of the optical image capturing system, focal lengths from the second lens element 220 to the sixth lens element 260 are f2, f3, f4, f5 and f6, respectively. The following relations are satisfied: |f2|+|f3|+|f4|+|f5|+|f6|=51.9801, |f1|+|f7|=8.6420 and |f2|+|f3|+|f4|+|f5|+|f6|>|f1|+|f7|.

In the second embodiment of the optical image capturing system, a central thickness of the sixth lens element 260 on the optical axis is TP6. A central thickness of the sixth lens element 270 on the optical axis is TP7. The following relations are satisfied: TP6=0.9525 mm and TP7=0.4852 mm.

In the second embodiment of the optical image capturing system, the first lens element 210, the fourth lens element 240, the fifth lens element 250 and the sixth lens element 260 are positive lens elements, and focal lengths of the first lens element 210, the fourth lens element 240, the fifth lens element 250 and the sixth lens element 260 are f1, f4, f5 and f6, respectively. A sum of focal lengths of all lens elements with positive refractive power is ΣPP. The following relations are satisfied: ΣPP=f1+f4+f5+f6=35.8351 mm and f1/(f1+f4+f5+f6)=0.1647. Hereby, it's favorable for allocating the positive refractive power of the first lens element 210 to others positive lens elements and the significant aberrations generated in the process of moving the incident light can be suppressed.

In the second embodiment of the optical image capturing system, focal lengths of the second lens element 220, the third lens element 230 and the seventh lens element 270 are f2, f3 and f7, respectively. A sum of focal lengths of all lens elements with negative refractive power is ΣNP. The following relation is satisfied: ΣNP=f2+f3+f7=−24.7870 mm and f7/(f2+f3+f7)=0.1106. Hereby, it's favorable for allocating the negative refractive power of the seventh lens element 270 to others negative lens elements.

In the second embodiment of the optical image capturing system, a distance perpendicular to the optical axis between a critical point on the object-side surface 272 of the seventh lens element and the optical axis is HVT71. A distance perpendicular to the optical axis between a critical point on the image-side surface 274 of the seventh lens element and the optical axis is HVT72. The following relations are satisfied: HVT71=0 mm, HVT72=2.24065 mm and HVT71/HVT72=0.

Please refer to the following Table 3 and Table 4.
The detailed data of the optical image capturing system of the second embodiment is as shown in Table 3.

TABLE 3

Data of the optical image capturing system
f = 5.2526 mm, f/HEP = 1.7, HAF = 36 deg

| Surface # | | Curvature Radius | Thickness | Material | Index | Abbe # | Focal length |
|---|---|---|---|---|---|---|---|
| 0 | Object | Plano | Plano | | | | |
| 1 | Lens 1 | 68.11996 | 0.483487 | Plastic | 1.565 | 58 | 4.405 |
| 2 | | −3.49625 | 0 | | | | |
| 3 | Ape. stop | Plano | 0.05 | | | | |
| 4 | Lens 2 | 4.03473 | 0.447528 | Plastic | 1.55 | 56.5 | −10.384 |
| 5 | | 2.57638 | 0.858457 | | | | |
| 6 | Lens 3 | −5.20633 | 0.23 | Plastic | 1.65 | 21.4 | −23.649 |
| 7 | | 78.27114 | 0.115778 | | | | |
| 8 | Lens 4 | −141.931 | 0.622323 | Plastic | 1.565 | 58 | 20.384 |
| 9 | | −4.21078 | 0.05 | | | | |
| 10 | Lens 5 | 7.56606 | 0.714199 | Plastic | 1.565 | 58 | 30.886 |
| 11 | | 25.07635 | 1.192391 | | | | |
| 12 | Lens 6 | −19.0648 | 0.952472 | Plastic | 1.565 | 58 | 4.587 |
| 13 | | −1.76128 | 0.403276 | | | | |
| 14 | Lens 7 | −137.931 | 0.48516 | Plastic | 1.53 | 55.8 | −2.818 |
| 15 | | 1.47037 | 0.5 | | | | |
| 16 | IR filter | Plano | 0.2 | | 1.517 | 64.2 | |
| 17 | | Plano | 0.694929 | | | | |
| 18 | Image plane | Plano | | | | | |

Reference wavelength (d-line) = 587.5 nm

As for the parameters of the aspheric surfaces of the second embodiment, reference is made to Table 4.

TABLE 4

Aspheric Coefficients

| Surface # | 1 | 2 | 4 | 5 | 6 | 7 | 8 |
|---|---|---|---|---|---|---|---|
| k = | −50 | −21.586601 | −5.210483 | −12.5848 | 5.807337 | −50 | 50 |
| A4 = | −3.30061E−03 | −7.05919E−03 | −2.64853E−03 | −9.68664E−03 | −6.05571E−03 | −6.49213E−03 | −1.19614E−02 |
| A6 = | 2.10836E−04 | 1.78341E−03 | 1.43036E−03 | 2.50120E−03 | 1.10636E−03 | 1.48510E−03 | 4.37485E−05 |
| A8 = | −5.02110E−04 | −8.63373E−04 | −5.21815E−04 | −2.85206E−05 | −5.79228E−04 | −2.52288E−04 | −1.54836E−04 |
| A10 = | 1.12193E−04 | 1.53993E−04 | 9.36345E−05 | −5.99588E−05 | −2.52690E−05 | 2.05622E−05 | 6.55356E−05 |
| A12 = | | | | | | | |
| A14 = | | | | | | | |

TABLE 4-continued

Aspheric Coefficients

| Surface # | 9 | 10 | 11 | 12 | 13 | 14 | 15 |
|---|---|---|---|---|---|---|---|
| k = | 0.292426 | −0.518495 | 42.211497 | 50 | −5.176421 | −50 | −5.363923 |
| A4 = | −1.79560E−03 | −1.75404E−03 | −7.72726E−03 | 2.46323E−03 | −3.36582E−03 | −2.20116E−02 | −1.45174E−02 |
| A6 = | 2.67143E−04 | 2.32594E−05 | 1.79035E−04 | 1.22405E−04 | 6.30874E−04 | 1.02246E−03 | 9.01618E−04 |
| A8 = | 2.47676E−05 | −9.54522E−05 | −1.39442E−05 | −9.38681E−05 | −5.96198E−05 | 2.85159E−04 | −4.47595E−05 |
| A10 = | 3.74307E−05 | −1.20664E−05 | −5.48540E−06 | −1.20263E−05 | −8.31172E−06 | 9.23914E−06 | −6.73215E−07 |
| A12 = | | 2.94692E−06 | −1.64479E−06 | −3.82680E−07 | −1.67895E−07 | −1.48358E−06 | 3.21116E−08 |
| A14 = | | 9.92798E−07 | 1.15804E−07 | 2.53737E−07 | 7.24677E−08 | 3.09070E−07 | 1.29223E−09 |

In the second embodiment, the presentation of the aspheric surface formula is similar to that in the first embodiment. Besides, the definitions of parameters in following tables are equal to those in the first embodiment, so the repetitious details need not be given here.

The following content may be deduced from Table 3 and Table 4.

Related inflection point values of second embodiment (Primary reference wavelength: 587.5 nm)

| InRS11 | InRS12 | InRS21 | InRS22 | InRS31 | InRS32 |
|---|---|---|---|---|---|
| −0.30489 | 0.28649 | 0.17251 | −0.48145 | −0.16835 | −0.16953 |

| InRS41 | InRS42 | InRS51 | InRS52 | InRS61 | InRS62 |
|---|---|---|---|---|---|
| −0.53090 | 0.17068 | −0.20092 | −0.24280 | −0.90559 | −0.60658 |

| InRS71 | InRS72 | (|InRS52| + |InRS61|)/IN56 | (|InRS62| + |InRS71|)/IN67 |
|---|---|---|---|
| 0.43762 | 7.51452 | 0.96310 | 2.58931 |

| HVT61 | HVT62 | HVT71 | HVT72 | HVT72/HOI | HVT72/HOS |
|---|---|---|---|---|---|

-continued

Related inflection point values of second embodiment (Primary reference wavelength: 587.5 nm)

| |f/f1| | |f/f2| | |f/f3| | |f/f4| | |f/f5| | |f/f6| |
|---|---|---|---|---|---|
| 0.89227 | 0.36194 | 0.70543 | 0.68658 | 0.27858 | 1.5633678 |

| |f/f7| | |f1/f2| | |ODT|% | |TDT|% | |InRS71|/TP7 | |InRS72|/TP7 |
|---|---|---|---|---|---|
| 1.92048 | 0.40564 | 2.18972 | 0.56970 | 1.25028 | 0.90202 |

| ΣPPR | ΣNPR | ΣPPR/|ΣNPR| | ΣPP | ΣNP | f1/ΣPP |
|---|---|---|---|---|---|
| 3.42080 | 2.98785 | 1.14490 | 35.72208 | −24.67265 | 0.16466 |

| f7/ΣNP | IN12/f | (TP1 + IN12)/TP2 | (TP7 + IN67)/TP6 | | |
|---|---|---|---|---|---|
| 0.11076 | 0.00953 | 1.1922 | 0.9328 | | |

| HOS | InTL | HOS/HOI | InS/HOS | InTL/HOS | ΣTP/InTL |
|---|---|---|---|---|---|
| 7.99801 | 6.60507 | 2.74657 | 0.93955 | 0.82584 | 0.59578 |

The following content may be deduced from Table 3 and Table 4.

Related inflection point values of second embodiment (Primary reference wavelength: 555 nm)

| HIF111 | 0.57370 | HIF111/HOI | 0.14664 | SGI111 | 0.002043 | | SGI111 |/(| SGI111 | + TP1) | 0.00420 |
|---|---|---|---|---|---|---|---|
| HIF112 | 1.81571 | HIF112/HOI | 0.46412 | SGI112 | −0.03506 | | SGI112 |/(| SGI112 | + TP1) | 0.07818 |
| HIF221 | 0.83215 | HIF221/HOI | 0.21271 | SGI221 | 0.10262 | | SGI221 |/(| SGI221 | + TP2) | 0.18653 |
| HIF321 | 0.38758 | HIF321/HOI | 0.09907 | SGI321 | 0.000808 | | SGI321 |/(| SGI321 | + TP3) | 0.00349 |
| HIF411 | 1.87684 | HIF411/HOI | 0.47975 | SGI411 | −0.15107 | | SGI411 |/(| SGI411 | + TP4) | 0.3205 |
| HIF421 | 1.85862 | HIF421/HOI | 0.47509 | SGI421 | −0.45039 | | SGI421 |/(| SGI421 | + TP4) | 2.6195 |
| HIF511 | 1.49057 | HIF511/HOI | 0.38101 | SGI511 | 0.135716 | | SGI511 |/(| SGI511 | + TP5) | 0.15968 |
| HIF521 | 0.66203 | HIF521/HOI | 0.16922 | SGI521 | 0.007306 | | SGI521 |/(| SGI521 | + TP5) | 0.01012 |
| HIF721 | 0.96202 | HIF721/HOI | 0.24591 | SGI721 | 0.221927 | | SGI721 |/(| SGI721 | + TP7) | 0.31386 |

-continued

Related inflection point values of second embodiment (Primary reference wavelength: 587.5 nm)

| 0 | 0 | 0.00000 | 2.24065 | 0.76945 | 0.28015 |
|---|---|---|---|---|---|

| InRSO | InRSI | Σ|InRS| | Σ|InRS|/InTL | Σ|InRS|/HOS |
|---|---|---|---|---|
| 2.72078 | 9.47204 | 12.19282 | 4.18710 | 5.56821 |

| (|InRS61| + |InRS62| + |InRS71| + |InRS72|)/InTL | (|InRS61| + |InRS62| + |InRS71| + |InRS72|)/HOS |
|---|---|
| 1.43289 | 1.18333 |

The Third Embodiment (Embodiment 3)

Figure 3A:
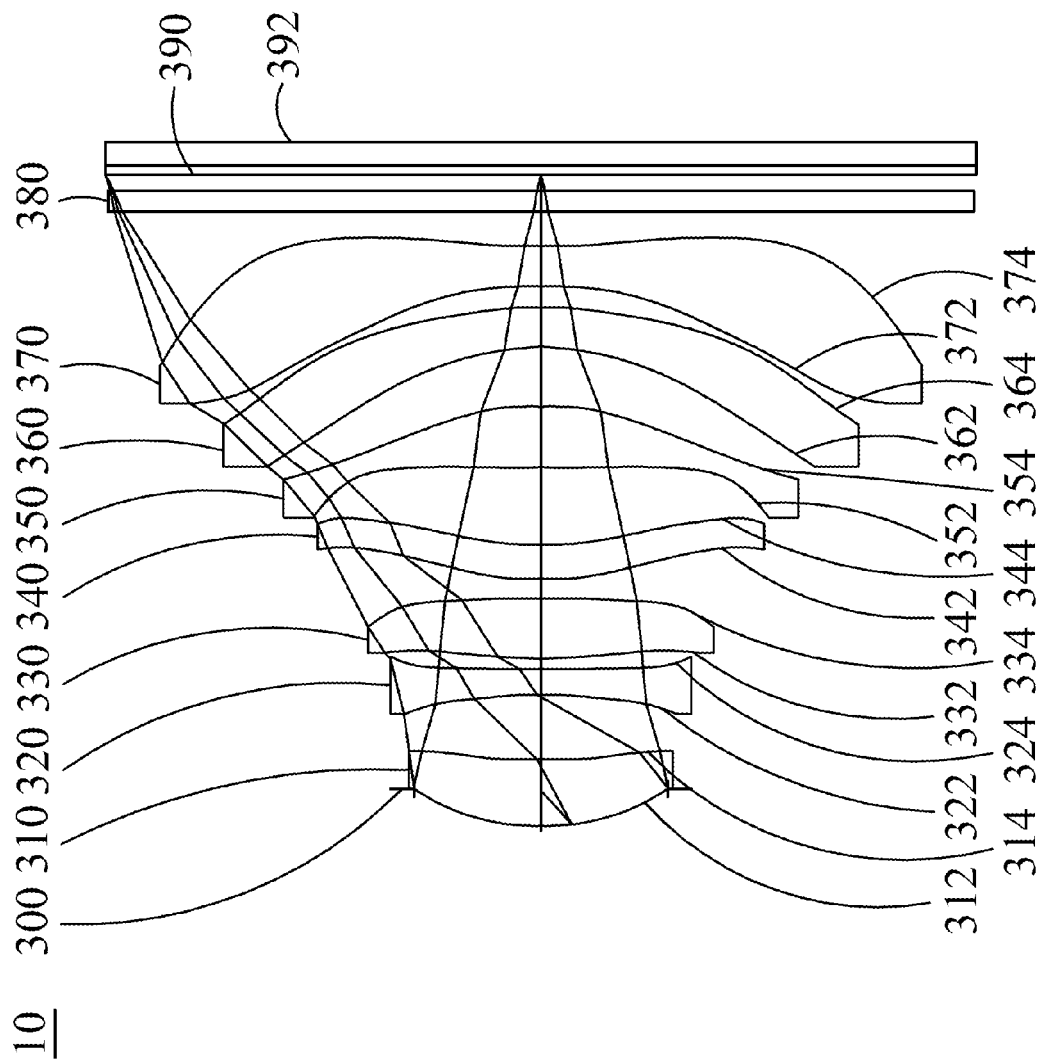
FIG. 3A is a schematic view of the optical image capturing system according to the third embodiment of the present application.
Figure 3B:
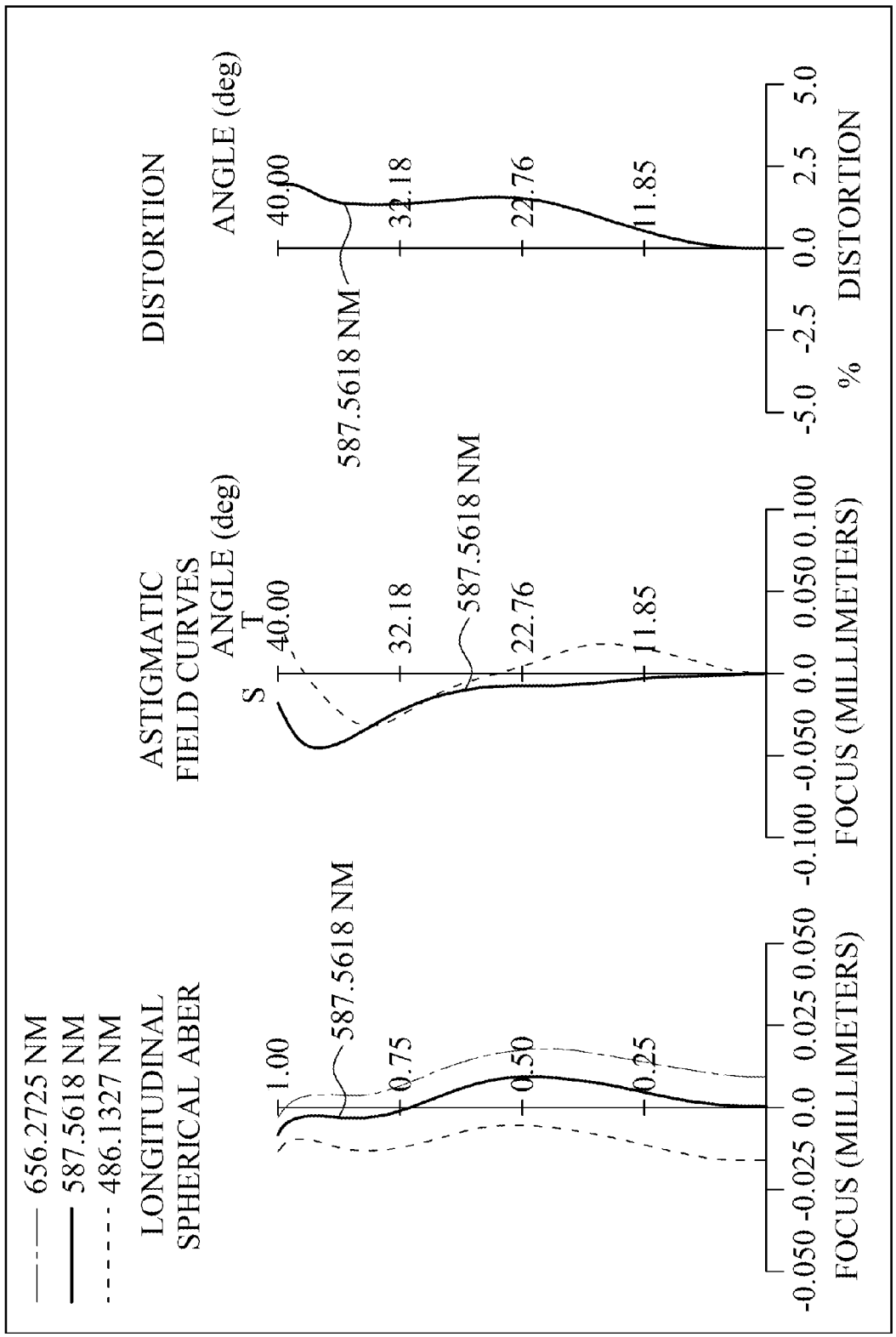
FIG. 3B is longitudinal spherical aberration curves, astigmatic field curves, and an optical distortion grid of the optical image capturing system in the order from left to right according to the third embodiment of the present application.
Figure 3C:
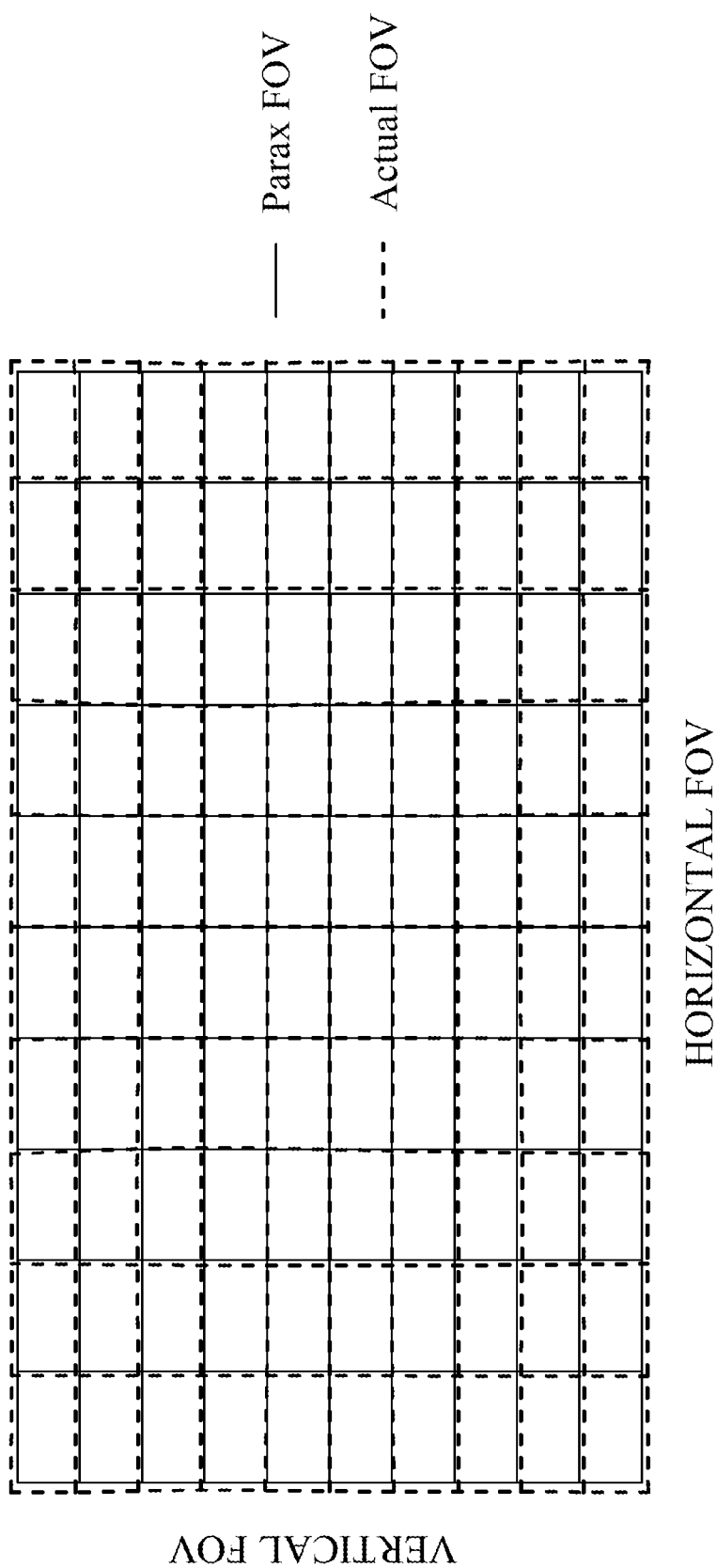
FIG. 3C is a TV distortion grid of the optical image capturing system according to the third embodiment of the present application.

Please refer to FIGS. 3A, FIG. 3B and FIG. 3C, FIG. 3A is a schematic view of the optical image capturing system according to the third embodiment of the present application, FIG. 3B is longitudinal spherical aberration curves, astigmatic field curves, and an optical distortion curve of the optical image capturing system in the order from left to right according to the third embodiment of the present application, and FIG. 3C is a TV distortion grid of the optical image capturing system according to the third embodiment of the present application. As shown in FIG. 3A, sequentially arranged from an object side to an image side, the optical image capturing system includes an aperture stop 300, a first lens element 310, a second lens element 320, a third lens element 330, a fourth lens element 340, a fifth lens element 350, a sixth lens element 360, a seventh lens element 370, an IR filter 380, an image plane 390, and an image sensing device 392.

The first lens element 310 has positive refractive power and it is made of plastic material. The first lens element 310 has a convex object-side surface 312 and a concave image-side surface 314, both of the object-side surface 312 and the image-side surface 314 are aspheric. The image-side surface 314 has one inflection point.

The second lens element 320 has negative refractive power and it is made of plastic material. The second lens element 320 has a concave object-side surface 322 and a concave image-side surface 324, and both of the object-side surface 322 and the image-side surface 324 are aspheric.

The third lens element 330 has positive refractive power and it is made of plastic material. The third lens element 330 has a convex object-side surface 332 and a convex image-side surface 334 and both of the object-side surface 332 and the image-side surface 334 are aspheric. The object-side surface 332 has one inflection point.

The fourth lens element 340 has positive refractive power and it is made of plastic material. The fourth lens element 340 has a convex object-side surface 342 and a concave image-side surface 344; both of the object-side surface 342 and the image-side surface 344 are aspheric and have one inflection point.

The fifth lens element 350 has positive refractive power and it is made of plastic material. The fifth lens element 350 has a convex object-side surface 352 and a convex image-side surface 354 and both of the object-side surface 352 and the image-side surface 354 are aspheric. The object-side surface 352 has one inflection point and the image-side surface 354 has two inflection points.

The sixth lens element 360 has negative refractive power and it is made of plastic material. The sixth lens element 360 has a concave object-side surface 362 and a convex image-side surface 364. The object-side surface 362 has two inflection points and image-side surface 364 has one inflection point. Hereby, the incident angle of the sixth lens element 360 in each viewing field may be effectively adjusted so as to improve the aberration.

The seventh lens element 370 has negative refractive power and it is made of plastic material. The seventh lens element 370 has a concave object-side surface 372 and a concave image-side surface 374. Hereby, the back focal length is reduced for keeping the miniaturization, to miniaturize the lens element effectively. In addition, the object-side surface 372 and the image-side surface 374 both have one inflection point, such that the angle of incident with incoming light from an off-axis view field can be suppressed effectively and the aberration in the off-axis view field can be corrected further.

The IR filter 380 is made of glass material without affecting the focal length of the optical image capturing system and it is disposed between the seventh lens element 370 and the image plane 390 without affecting the focal length of the optical image capturing system.

In the third embodiment of the optical image capturing system, focal lengths from the second lens element 320 to the sixth lens element 360 are f2, f3, f4, f5 and f6, respectively. The following relations are satisfied: $|f2|+|f3|+|f4|+|f5|+|f6|=53.9016$, $|f1|+|f7|=9.0440$ and $|f2|+|f3|+|f4|+|f5|+|f6|>|f1|+|f7|$.

In the third embodiment of the optical image capturing system, a central thickness of the sixth lens element 360 on the optical axis is TP6. A central thickness of the seventh lens element 370 on the optical axis is TP7. The following relations are satisfied: TP6=0.3549 mm and TP7=0.3521 mm.

In the third embodiment of the optical image capturing system, focal lengths of the first lens element 310, the third lens element 330, the fourth lens element 340 and the fifth lens element 350 are f1, f3, f4, and f5, respectively. A sum of all the lens elements having positive refractive power is ΣPP, and following relations are satisfied: ΣPP=f1+f3+f4+f5=44.4613 mm and f1/(f1+f3+f4+f5)=0.1136 mm. Hereby, it's favorable for allocating the positive refractive power of the first lens element 310 to others positive lens elements and the significant aberrations generated in the process of moving the incident light can be suppressed.

In the third embodiment of the optical image capturing system, focal lengths of the second lens element 320, the sixth lens element 360 and the seventh lens element 370 are f2, f6 and f7, respectively. A sum of all the lens elements having negative refractive power is ΣNP, and following relations are satisfied: ΣNP=f2+f6+f7=−18.4843 mm and f7/(f2+f6+f7)=0.2160. Hereby, it's favorable for allocating the negative refractive power of the seventh lens element 370 to others negative lens elements and the significant aberrations generated in the process of moving the incident light can be suppressed.

In the third embodiment of the optical image capturing system, a distance perpendicular to the optical axis between a critical point on the object-side surface 372 of the seventh lens element and the optical axis is HVT71. A distance perpendicular to the optical axis between a critical point on the image-side surface 374 of the seventh lens element and the optical axis is HVT72. The following relations are satisfied: HVT71=0 mm, HVT72=1.31341 mm and HVT71/HVT72=0.

Please refer to the following Table 5 and Table 6.

The detailed data of the optical image capturing system of the third embodiment is as shown in Table 5.

TABLE 5

Third Embodiment
f = 4.5724 mm, f/HEP = 2.0, HAF = 40 deg

| Surface# | | Curvature Radius | Thickness | Material | Index | Abbe # | Focal length |
|---|---|---|---|---|---|---|---|
| 0 | Object | Plano | Plano | | | | |
| 1 | Ape. stop | Plano | −0.33354 | | | | |
| 2 | Lens 1 | 2.15728 | 0.600257 | Plastic | 1.565 | 58 | 5.051 |
| 3 | | 7.95102 | 0.580328 | | | | |
| 4 | Lens 2 | −4.57617 | 0.23 | Plastic | 1.64 | 23.3 | −6.067 |
| 5 | | 26.12977 | 0.096215 | | | | |
| 6 | Lens 3 | 6.53034 | 0.536917 | Plastic | 1.565 | 58 | 9.11 |
| 7 | | −23.5826 | 0.170061 | | | | |
| 8 | Lens 4 | 2.58441 | 0.302053 | Plastic | 1.65 | 21.4 | 26.419 |
| 9 | | 2.9022 | 0.695806 | | | | |
| 10 | Lens 5 | 17.31457 | 0.552455 | Plastic | 1.584 | 40.5 | 3.881 |
| 11 | | −2.57945 | 0.526363 | | | | |
| 12 | Lens 6 | −2.38582 | 0.354906 | Plastic | 1.65 | 21.4 | −8.424 |
| 13 | | −4.47565 | 0.200051 | | | | |
| 14 | Lens 7 | −3.19504 | 0.352119 | Plastic | 1.565 | 58 | −3.993 |
| 15 | | 7.98292 | 0.3 | | | | |
| 16 | IR filter | Plano | 0.2 | | 1.517 | 64.2 | |
| 17 | | Plano | 0.136012 | | | | |
| 18 | Image plane | Plano | | | | | |

Reference wavelength (d-line) = 587.5 nm

As for the parameters of the aspheric surfaces of the third embodiment, reference is made to Table 6.

TABLE 6

Aspheric Coefficients

| Surface # | 2 | 3 | 4 | 5 | 6 | 7 | 8 |
|---|---|---|---|---|---|---|---|
| k = | −0.04929 | 18.763452 | −3.146052 | 50 | 11.511117 | −50 | −8.387968 |
| A4 = | 3.99752E−03 | −2.65753E−03 | −5.38259E−04 | 4.26480E−04 | −1.12976E−02 | −5.06681E−03 | −4.77471E−03 |
| A6 = | −3.43914E−05 | −5.82241E−03 | −3.27978E−03 | 7.15484E−03 | −1.05403E−02 | −8.71238E−03 | −1.13776E−03 |
| A8 = | 3.06709E−03 | 3.81493E−03 | 2.08987E−03 | −1.24014E−03 | −1.67228E−03 | −1.30073E−03 | −3.79868E−05 |
| A10 = | −1.92345E−03 | −3.58015E−03 | −1.95683E−03 | 1.58148E−03 | 5.97801E−04 | −1.51067E−04 | −5.94383E−05 |
| A12 = | | | | | | | |
| A14 = | | | | | | | |

| Surface # | 9 | 10 | 11 | 12 | 13 | 14 | 15 |
|---|---|---|---|---|---|---|---|
| k = | −10.084497 | −21.814536 | −1.977364 | −0.189956 | −0.012338 | −0.236608 | −49.681093 |
| A4 = | −9.45197E−03 | −1.89927E−02 | 2.12693E−03 | 1.37038E−02 | 3.06638E−03 | 2.49475E−03 | −4.17639E−03 |
| A6 = | −2.52390E−04 | 1.40796E−03 | 8.09418E−04 | −1.01340E−03 | −5.02083E−04 | 4.46483E−04 | −8.87102E−04 |
| A8 = | −6.25262E−05 | −6.62896E−04 | 1.73159E−04 | 8.89894E−05 | −4.41194E−05 | 2.61112E−05 | 3.25266E−04 |
| A10 = | −3.28088E−05 | −5.77386E−05 | 6.40561E−06 | 4.68212E−05 | −9.48040E−07 | 1.39210E−06 | −4.51219E−08 |
| A12 = | | −4.45309E−06 | −1.80035E−06 | 4.24385E−06 | 3.32117E−07 | 2.96859E−08 | −2.85078E−08 |
| A14 = | | −2.11574E−06 | −6.35294E−07 | −6.87562E−07 | 7.72687E−08 | −9.92819E−09 | 6.51010E−10 |

In the third embodiment, the presentation of the aspheric surface formula is similar to that in the first embodiment. Besides, the definitions of parameters in following tables are equal to those in the first embodiment, so the repetitious details need not be given here.

The following content may be deduced from Table 5 and Table 6.

Third embodiment (Primary reference wavelength: 587.5 nm)

| InRS11 | InRS12 | InRS21 | InRS22 | InRS31 | InRS32 |
|---|---|---|---|---|---|
| 0.07428 | −0.17427 | 0.09621 | 0.05131 | −0.25488 | 0.27032 |

| InRS41 | InRS42 | InRS51 | InRS52 | InRS61 | InRS62 |
|---|---|---|---|---|---|
| 0.19871 | −0.43904 | −0.65224 | −1.06356 | −1.03595 | −1.05610 |

| InRS71 | InRS72 | (|InRS52| + |InRS61|)/IN56 | (|InRS62| + |InRS71|)/IN67 |
|---|---|---|---|
| −1.04609 | 5.49496 | 3.98871 | 10.50827 |

| HVT61 | HVT62 | HVT71 | HVT72 | HVT72/HOI | HVT72/HOS |
|---|---|---|---|---|---|
| 0 | 0 | 0.00000 | 1.59699 | 0.40844 | 0.27400 |

| InRSO | InRSI | Σ|InRS| | Σ|InRS|/InTL | Σ|InRS|/HOS |
|---|---|---|---|---|
| 3.35837 | 8.54956 | 11.90792 | 3.04550 | 5.56286 |

Third embodiment (Primary reference wavelength: 587.5 nm)

| (|InRS61| + |InRS62| + |InRS71| + |InRS72|)/InTL | (|InRS61| + |InRS62| + |InRS71| + |InRS72|)/HOS |
|---|---|
| 1.66100 | 1.48118 |

| |f/f1| | |f1/f2| | |f1/f3| | |f1/f4| | |f1/f5| | |f1/f6| |
|---|---|---|---|---|---|
| 0.90631 | 0.75792 | 0.50244 | 0.17440 | 1.18085 | 0.5459792 |

| |f/f7| | |f1/f2| | |ODT|% | |TDT|% | |InRS71|/TP7 | |InRS72|/TP7 |
|---|---|---|---|---|---|
| 1.146335 | 0.83627 | 2.14061 | 0.72563 | 2.99927 | 2.97084 |

| ΣPPR | ΣNPR | ΣPPR/ΣNPR| | ΣPP | ΣNP | f1/ΣPP |
|---|---|---|---|---|---|
| 2.76400 | 2.45024 | 1.12805 | 44.14425 | −18.35843 | 0.11405 |

| f7/ΣNP | IN12/f | (TP1 + IN12)/TP2 | (TP7 + IN67)/TP6 |
|---|---|---|---|
| 0.21682 | 0.12718 | 5.1330 | 1.5559 |

| HOS | InTL | HOS/HOT | InS/HOS | InTL/HOS | ΣTP/InTL |
|---|---|---|---|---|---|
| 5.82851 | 5.19753 | 1.49067 | 0.94277 | 0.89174 | 0.56348 |

The following content may be deduced from Table 5 and Table 6.

Related inflection point values of third embodiment (Primary reference wavelength: 555 nm)

| HIF121 | 0.93144 | HIF121/HOI | 0.23817 | SGI121 | 0.05346 | | SGI121 |/(| SGI121 | + TP1) | 0.18861 |
|---|---|---|---|---|---|---|---|
| HIF311 | 0.76938 | HIF311/HOI | 0.19673 | SGI311 | 0.04118 | | SGI311 |/(| SGI311 | + TP3) | 0.07123 |
| HIF411 | 1.05305 | HIF411/HOI | 0.26927 | SGI411 | 0.16459 | | SGI411 |/(| SGI411 | + TP4) | 0.35271 |
| HIF421 | 0.97382 | HIF421/HOI | 0.24901 | SGI421 | 0.12611 | | SGI421 |/(| SGI421 | + TP4) | 0.29454 |
| HIF511 | 0.50607 | HIF511/HOI | 0.12940 | SGI511 | 0.00614 | | SGI511 |/(| SGI511 | + TP5) | 0.01099 |
| HIF521 | 1.47052 | HIF521/HOI | 0.37602 | SGI521 | −0.36841 | | SGI521 |/(| SGI521 | + TP5) | −2.00172 |
| HIF522 | 2.16251 | HIF522/HOI | 0.55296 | SGI522 | −0.61212 | | SGI522 |/(| SGI522 | + TP5) | 10.25959 |
| HIF611 | 1.91409 | HIF611/HOI | 0.48944 | SGI611 | −0.72246 | | SGI611 |/(| SGI611 | + TP6) | 1.96558 |
| HIF612 | 2.33324 | HIF612/HOI | 0.59661 | SGI612 | −0.98967 | | SGI612 |/(| SGI612 | + TP6) | 1.55912 |
| HIF621 | 2.56378 | HIF621/HOI | 0.65556 | SGI621 | −0.84232 | | SGI621 |/(| SGI621 | + TP6) | 1.72814 |
| HIF711 | 2.11632 | HIF711/HOI | 0.54115 | SGI711 | −0.66907 | | SGI711 |/(| SGI711 | + TP7) | 2.11097 |
| HIF721 | 0.91541 | HIF721/HOI | 0.23407 | SGI721 | 0.04259 | | SGI721 |/(| SGI721 | + TP7) | 0.10790 |

The Fourth Embodiment (Embodiment 4)

Figure 4A:
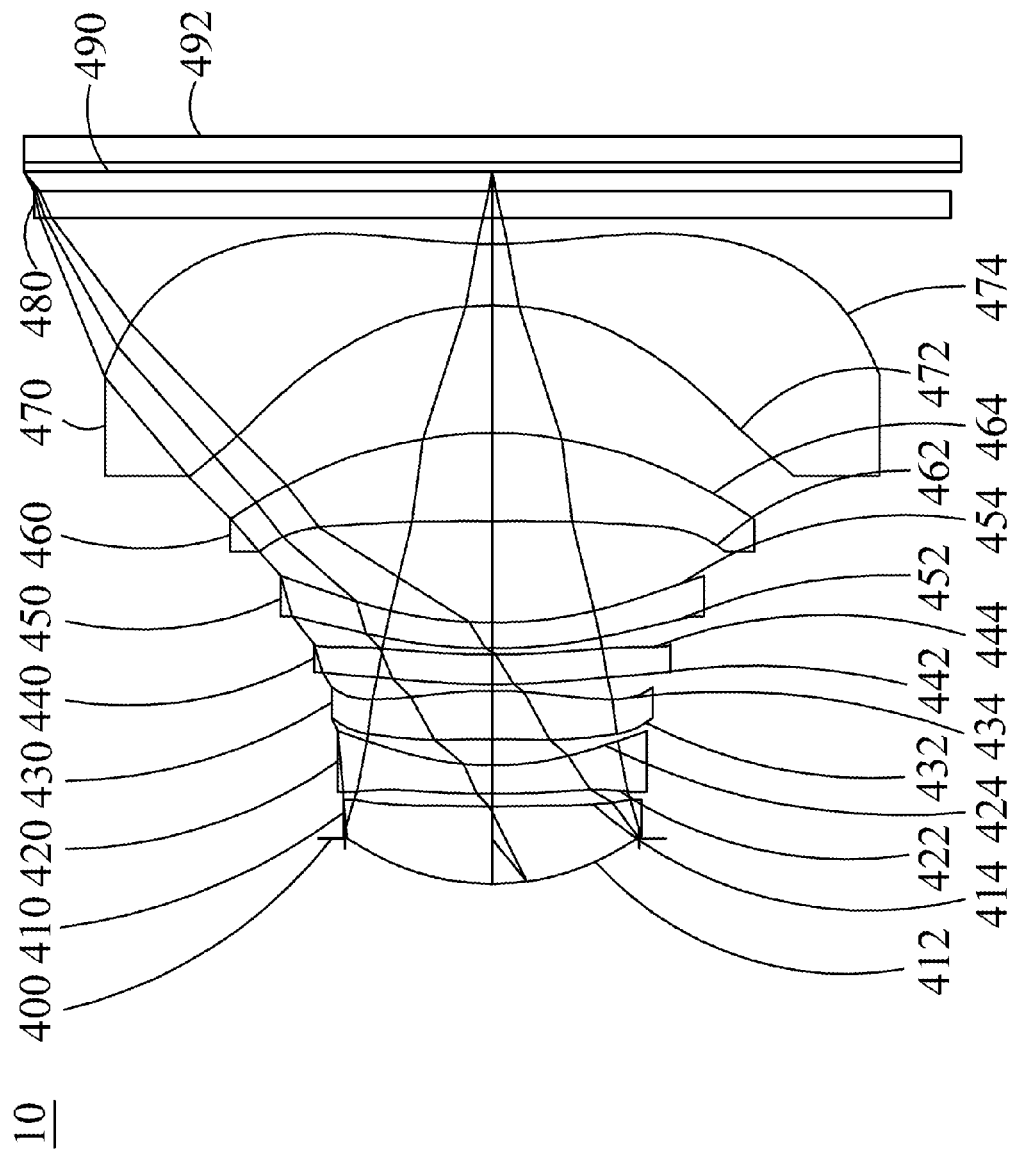
FIG. 4A is a schematic view of the optical image capturing system according to the fourth embodiment of the present application.
Figure 4B:
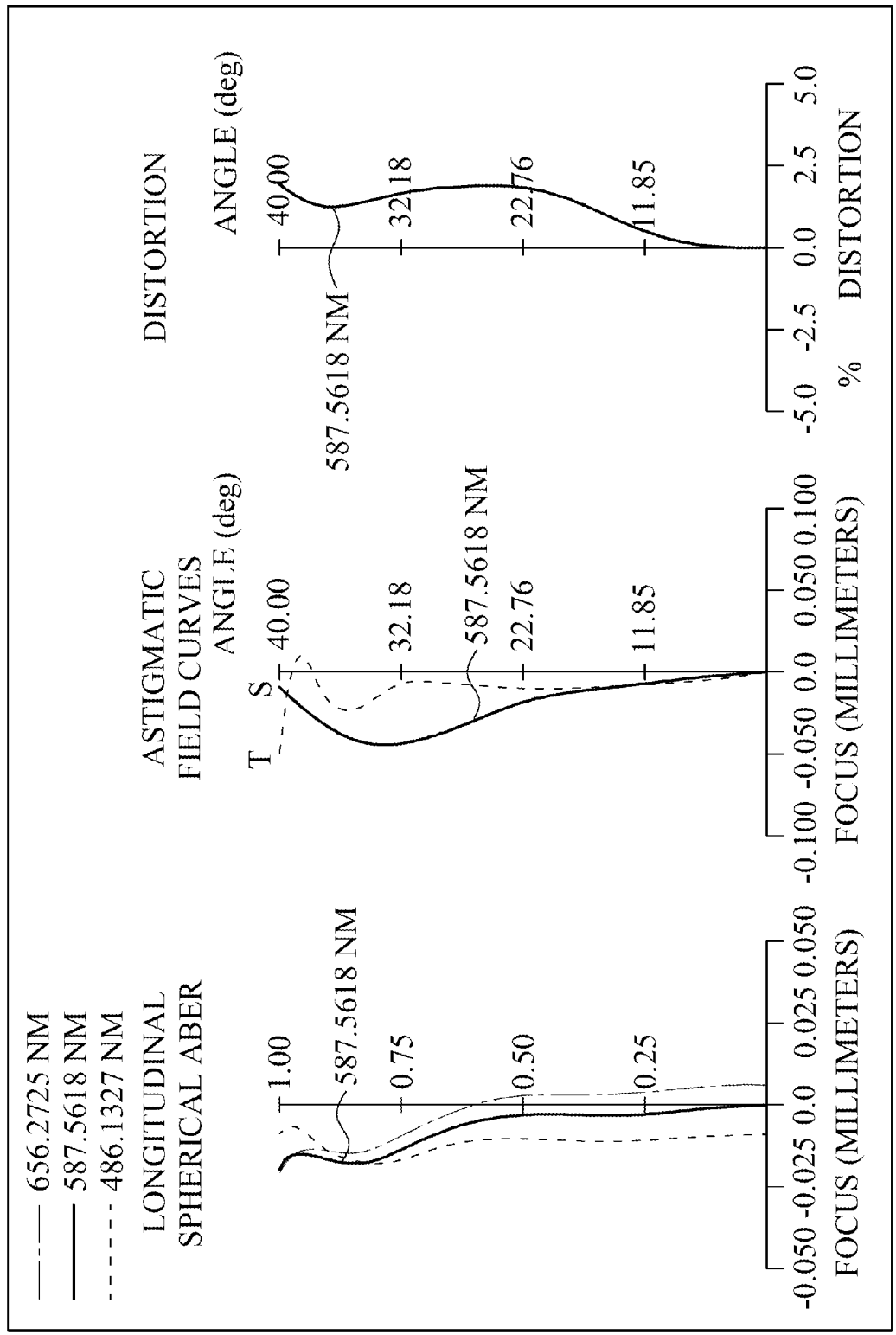
FIG. 4B is longitudinal spherical aberration curves, astigmatic field curves, and an optical distortion grid of the optical image capturing system in the order from left to right according to the fourth embodiment of the present application.
Figure 4C:
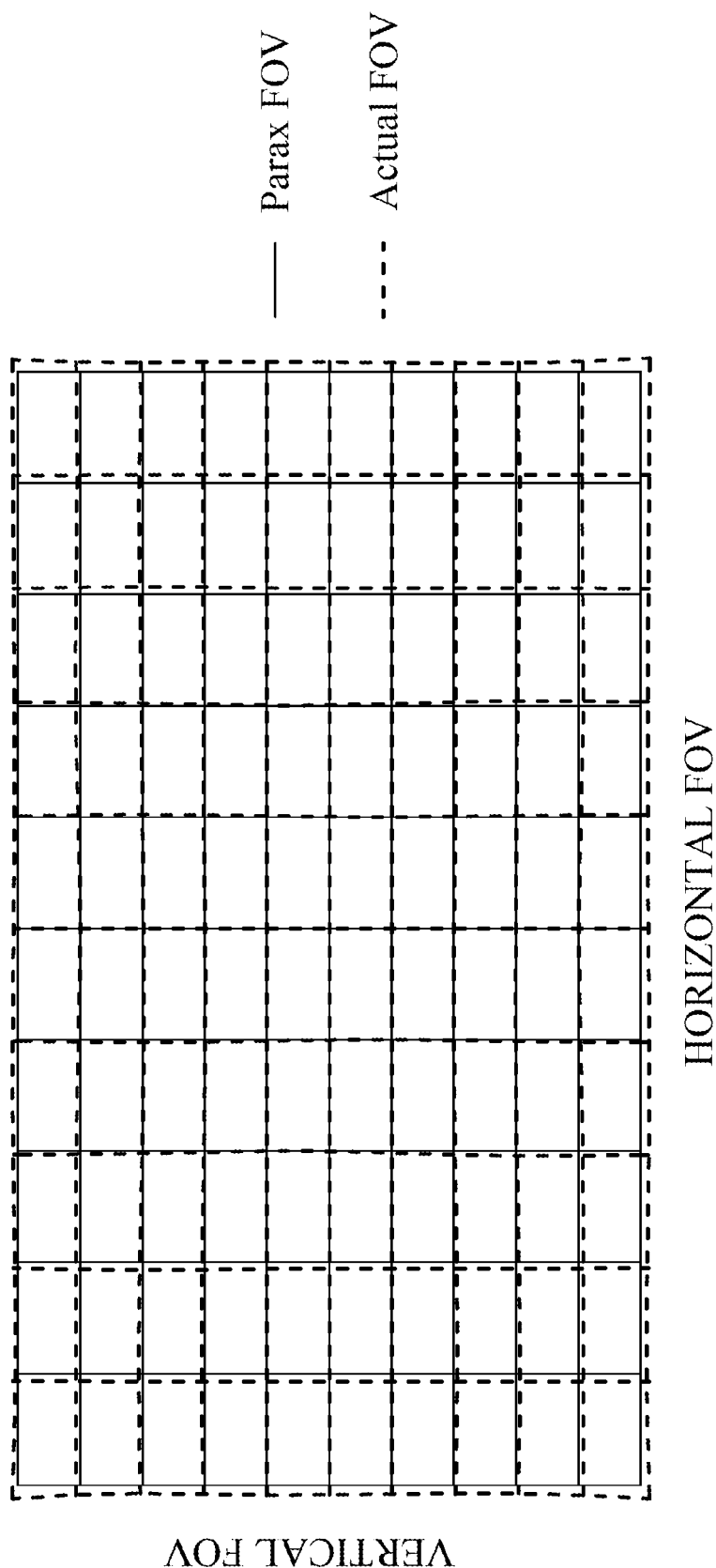
FIG. 4C is a TV distortion grid of the optical image capturing system according to the fourth embodiment of the present application.

Please refer to FIGS. 4A, FIG. 4B and FIG. 4C, FIG. 4A is a schematic view of the optical image capturing system according to the fourth embodiment of the present application, FIG. 4B is longitudinal spherical aberration curves, astigmatic field curves, and an optical distortion curve of the optical image capturing system in the order from left to right according to the fourth embodiment of the present application, and FIG. 4C is a TV distortion grid of the optical image capturing system according to the fourth embodiment of the present application. As shown in FIG. 4A, sequentially arranged from an object side to an image side, the optical image capturing system includes an aperture stop 400, a first lens element 410, a second lens element 420, a third lens element 430, a fourth lens element 440, a fifth lens element 450, a sixth lens element 460, a seventh lens element 470, an IR filter 480, an image plane 490, and an image sensing device 492.

The first lens element 410 has positive refractive power and it is made of plastic material. The first lens element 410 has a convex object-side surface 412 and a concave image-side surface 414, and both of the object-side surface 412 and the image-side surface 414 are aspheric. The image-side surface 414 has one inflection point.

The second lens element 420 has negative refractive power and it is made of plastic material. The second lens element 420 has a convex object-side surface 422 and a concave image-side surface 424, and both of the object-side surface 422 and the image-side surface 424 are aspheric. The object-side surface 422 has one inflection point.

The third lens element 430 has positive refractive power and it is made of plastic material. The third lens element 430 has a concave object-side surface 432 and a convex image-side surface 434 and both of the object-side surface 432 and the image-side surface 434 are aspheric and have one inflection point.

The fourth lens element 440 has negative refractive power and it is made of plastic material. The fourth lens element 440 has a convex object-side surface 442 and a concave image-side surface 444 and both of the object-side surface 442 and the image-side surface 444 are aspheric and have two inflection points.

The fifth lens element 450 has negative refractive power and it is made of plastic material. The fifth lens element 450 has a convex object-side surface 452 and a concave image-side surface 454 and both of the object-side surface 452 and the image-side surface 454 are aspheric and have one inflection point.

The sixth lens element 460 has positive refractive power and it is made of plastic material. The sixth lens element 460 has a concave object-side surface 462 and a convex image-side surface 464. Hereby, the incident angle of the sixth lens element in each viewing field may be effectively adjusted so as to improve the aberration.

The seventh lens element 470 has negative refractive power and it is made of plastic material. The seventh lens element 470 has a concave object-side surface 472 and a concave image-side surface 474. Hereby, the back focal length is reduced for keeping the miniaturization, to miniaturize the lens element effectively. In addition, the object-side surface 472 has two inflection points and the image-side surface 474 has one inflection point, such that the angle of incident with incoming light from an off-axis view field can be suppressed effectively and the aberration in the off-axis view field can be corrected further.

The IR filter 480 is made of glass material without affecting the focal length of the optical image capturing system and it is disposed between the seventh lens element 470 and the image plane 490 without affecting the focal length of the optical image capturing system.

In the fourth embodiment of the optical image capturing system, focal lengths of the second lens element 420 to the sixth lens element 460 are f2, f3, f4, f5 and f6, respectively. The following relation is satisfied: $|f2|+|f3|+|f4|+|f5|+|f6|=472.6722$ mm, $|f1|+|f7|=7.1716$ mm and $|f2|+|f3|+|f4|+|f5|+|f6|>|f1|+|f7|$.

In the fourth embodiment of the optical image capturing system, a central thickness of the sixth lens element 460 on the optical axis is TP6. A central thickness of the seventh lens element 470 on the optical axis is TP7. The following relations are satisfied: TP6=0.6737 mm and TP7=0.4780 mm.

In the fourth embodiment of the optical image capturing system, focal lengths of the first lens element 410, the third lens element 430 and the sixth lens element 460 are f1, f3 and f6, respectively. A sum of focal lengths of all lens elements with positive refractive power is ΣPP. The following relations are satisfied: $\Sigma PP=f1+f3+f6=17.4258$ mm and $f1/(f1+f3+f6)=0.2264$. Hereby it's favorable for allocating the positive refractive power of the first lens element 410 to others positive lens elements and the significant aberrations generated in the process of moving the incident light can be suppressed.

In the fourth embodiment of the optical image capturing system, focal lengths of the second lens element 420, the fourth lens element 440, the fifth lens element 450 and the seventh lens element 470 are f2, f4, f5 and f7, respectively. A sum of focal lengths of all lens elements with negative refractive power is ΣNP. The following relations are satisfied: $\Sigma NP=f2+f4+f5+f7=-460.1883$ mm and $f7/(f2+f4+f5+f7)=0.0069$. Hereby, it's favorable for allocating the negative refractive power of the seventh lens element 470 to others negative lens elements.

In the fourth embodiment of the optical image capturing system, a distance perpendicular to the optical axis between a critical point on the object-side surface 472 of the seventh lens element and the optical axis is HVT71. A distance perpendicular to the optical axis between a critical point on the image-side surface 474 of the seventh lens element and the optical axis is HVT72. The following relations are satisfied: HVT71=mm, HVT72=mm and HVT71/HVT72=0.

Please refer to the following Table 7 and Table 8.

The detailed data of the optical image capturing system of the fourth embodiment is as shown in Table 7.

TABLE 7

Data of the optical image capturing system
f = 4.5913 mm, f/HEP = 2.0, HAF = 40 deg

| Surface# | | Curvature Radius | Thickness | Material | Index | Abbe # | Focal length |
|---|---|---|---|---|---|---|---|
| 0 | Object | Plano | Plano | | | | |
| 1 | Ape. stop | Plano | −0.33584 | | | | |
| 2 | Lens 1 | 2.03058 | 0.590857 | Plastic | 1.565 | 58 | 3.9446 |
| 3 | | 20.4411 | 0.095186 | | | | |
| 4 | Lens 2 | 7.2165 | 0.23 | Plastic | 1.607 | 26.6 | −5.5279 |
| 5 | | 2.2629 | 0.203986 | | | | |
| 6 | Lens 3 | −25.8857 | 0.366806 | Plastic | 1.565 | 58 | 7.4947 |
| 7 | | −3.6578 | 0.05 | | | | |
| 8 | Lens 4 | 4.82993 | 0.23 | Plastic | 1.583 | 30.2 | −417.085 |
| 9 | | 4.65281 | 0.05 | | | | |
| 10 | Lens 5 | 4.07572 | 0.2 | Plastic | 1.607 | 26.6 | −34.3868 |
| 11 | | 3.34669 | 0.787677 | | | | |
| 12 | Lens 6 | −26.3844 | 0.673693 | Plastic | 1.565 | 58 | 5.9865 |
| 13 | | −3.02569 | 0.986435 | | | | |
| 14 | Lens 7 | −2.52419 | 0.477982 | Plastic | 1.514 | 56.8 | −3.1886 |
| 15 | | 4.97372 | 0.2 | | | | |
| 16 | IR filter | Plano | 0.2 | | 1.517 | 64.2 | |
| 17 | | Plano | 0.157356 | | | | |
| 18 | Image Plane | Plano | | | | | |

Reference wavelength (d-line) = 587.5 nm

As for the parameters of the aspheric surfaces of the fourth embodiment, reference is made to Table 8.

TABLE 8

Aspheric Coefficients

| Surface # | 2 | 3 | 4 | 5 | 6 | 7 | 8 |
|---|---|---|---|---|---|---|---|
| k = | −0.191857 | 25.98754 | −50 | −4.999511 | −50 | −9.392737 | −42.359197 |
| A4 = | 6.14386E-03 | 2.32915E-02 | −2.49806E-02 | 4.00683E-03 | 3.95467E-02 | 2.10900E-02 | −1.42368E-02 |
| A6 = | −3.31769E-03 | −1.52625E-02 | −7.01466E-03 | −3.20652E-05 | 2.03340E-02 | 2.43080E-02 | 1.78401E-04 |
| A8 = | 8.88009E-03 | 1.70942E-02 | 4.64711E-03 | −3.92503E-03 | 7.65770E-03 | 9.32984E-03 | 5.05797E-04 |
| A10 = | −3.39721E-03 | −1.03920E-02 | −3.12460E-03 | 2.24376E-03 | −3.18162E-03 | 1.06022E-03 | 7.36701E-04 |
| A12 = | | | | | | | |
| A14 = | | | | | | | |

| Surface # | 9 | 10 | 11 | 12 | 13 | 14 | 15 |
|---|---|---|---|---|---|---|---|
| k = | −47.139839 | −0.966022 | −0.488959 | 50 | −5.337175 | −0.340205 | −50 |
| A4 = | −2.47822E-02 | −3.22998E-03 | −2.50181E-03 | −1.24457E-03 | −8.76726E-03 | −2.93139E-02 | −1.46251E-02 |
| A6 = | −4.09121E-03 | −1.22303E-03 | −4.37624E-04 | −3.09245E-03 | −1.02820E-03 | 4.22896E-03 | 5.73622E-04 |
| A8 = | 1.29767E-03 | −5.29555E-04 | −5.19599E-04 | 9.21696E-05 | 2.59804E-04 | −1.46156E-04 | |
| A10 = | 1.83292E-03 | 8.63712E-05 | −7.53064E-05 | 2.58380E-05 | 3.49235E-05 | 1.81189E-05 | 1.04247E-05 |
| A12 = | | 1.13272E-04 | 2.62827E-05 | −8.54214E-07 | 4.63569E-06 | −4.73923E-06 | 8.16570E-07 |
| A14 = | | −5.84875E-05 | −7.62110E-06 | −5.71425E-06 | −1.72555E-06 | −4.15107E-08 | −1.42180E-07 |

In the fourth embodiment, the presentation of the aspheric surface formula is similar to that in the first embodiment. Besides, the definitions of parameters in following tables are equal to those in the first embodiment, so the repetitious details need not be given here.

The following content may be deduced from Table 7 and Table 8.

Fourth embodiment (Primary reference wavelength: 587.5 nm)

| InRS11 | InRS12 | InRS21 | InRS22 | InRS31 | InRS32 |
|---|---|---|---|---|---|
| 0.04746 | 0.00504 | 0.28161 | 0.19219 | 0.05544 | 0.09726 |

| InRS41 | InRS42 | InRS51 | InRS52 | InRS61 | InRS62 |
|---|---|---|---|---|---|
| 0.07943 | 0.25099 | 0.38047 | −0.32036 | −0.76372 | −1.43347 |

| InRS71 | InRS72 | (|InRS52| + |InRS61|)/ IN56 | (|InRS62| + |InRS71|)/ IN67 |
|---|---|---|---|
| −1.34926 | 5.16368 | 1.37630 | 2.82100 |

| HVT61 | HVT62 | HVT71 | HVT72 | HVT72/ HOI | HVT72/ HOS |
|---|---|---|---|---|---|
| 0 | 0 | 0.00000 | 1.31339 | 0.33591 | 0.23882 |

-continued

Fourth embodiment (Primary reference wavelength: 587.5 nm)

| InRSO | InRSI | Σ\|InRS\| | Σ\|InRS\|/InTL | Σ\|InRS\|/HOS |
|---|---|---|---|---|
| 2.95739 | 7.46299 | 10.42038 | 2.66506 | 5.19927 |

| (\|InRS61\| + \|InRS62\| + \|InRS71\| + \|InRS72\|)/InTL | (\|InRS61\| + \|InRS62\| + \|InRS71\| + \|InRS72\|)/HOS |
|---|---|
| 1.76225 | 1.58380 |

| \|f/f1\| | \|f/f2\| | \|f/f3\| | \|f/f4\| | \|f/f5\| | \|f/f6\| |
|---|---|---|---|---|---|
| 1.16128 | 0.82907 | 0.61121 | 0.01098 | 0.13327 | 0.7651855 |

| \|f/f7\| | \|f1/f2\| | \|ODT\|% | \|TDT\|% | \|InRS71\|/TP7 | \|InRS72\|/TP7 |
|---|---|---|---|---|---|
| 1.436639 | 0.71393 | 2.00420 | 0.74484 | 2.99900 | 2.82283 |

| ΣPPR | ΣNPR | ΣPPR/\|ΣNPR\| | ΣPP | ΣNP | f1/ΣPP |
|---|---|---|---|---|---|
| 2.53767 | 2.40996 | 1.05299 | 17.41797 | −460.00437 | 0.22637 |

| f7/ΣNP | IN12/f | (TP1 + IN12)/TP2 | (TP7 + IN67)/TP6 |
|---|---|---|---|
| 0.00693 | 0.02079 | 2.9830 | 2.1737 |

| HOS | InTL | HOS/HOI | InS/HOS | InTL/HOS | ΣTP/InTL |
|---|---|---|---|---|---|
| 5.49952 | 4.94262 | 1.40653 | 0.93893 | 0.89874 | 0.56030 |

The following content may be deduced from Table 7 and Table 8.

Related inflection point values of fourth embodiment (Primary reference wavelength: 555 nm)

| HIF121 | 0.95846 | HIF121/HOI | 0.24506 | SGI121 | 0.03601 | \|SGI121\|/(\|SGI121\| + TP1) | 0.13538 |
| HIF211 | 0.53133 | HIF211/HOI | 0.13585 | SGI211 | 0.01628 | \|SGI211\|/(\|SGI211\| + TP2) | 0.06612 |
| HIF311 | 0.27108 | HIF311/HOI | 0.06931 | SGI311 | −0.00120 | \|SGI311\|/(\|SGI311\| + TP3) | 0.00327 |
| HIF321 | 0.59253 | HIF321/HOI | 0.15150 | SGI321 | −0.04181 | \|SGI321\|/(\|SGI321\| + TP3) | 0.12864 |
| HIF411 | 0.71831 | HIF411/HOI | 0.18366 | SGI411 | 0.04111 | \|SGI411\|/(\|SGI411\| + TP4) | 0.15164 |
| HIF412 | 1.05895 | HIF412/HOI | 0.27075 | SGI412 | 0.06954 | \|SGI412\|/(\|SGI412\| + TP4) | 0.23216 |
| HIF421 | 0.55698 | HIF421/HOI | 0.14241 | SGI421 | 0.02664 | \|SGI421\|/(\|SGI421\| + TP4) | 0.10380 |
| HIF422 | 1.11259 | HIF422/HOI | 0.28446 | SGI422 | 0.05415 | \|SGI422\|/(\|SGI422\| + TP4) | 0.19056 |
| HIF511 | 1.26333 | HIF511/HOI | 0.32300 | SGI511 | 0.18054 | \|SGI511\|/(\|SGI511\| + TP5) | 0.47444 |
| HIF521 | 1.35764 | HIF521/HOI | 0.34712 | SGI521 | 0.26306 | \|SGI521\|/(\|SGI521\| + TP5) | 0.56809 |
| HIF711 | 1.84187 | HIF711/HOI | 0.47092 | SGI711 | −0.88157 | \|SGI711\|/(\|SGI711\| + TP7) | 2.18435 |
| HIF712 | 2.55238 | HIF712/HOI | 0.65258 | SGI712 | −1.42068 | \|SGI712\|/(\|SGI712\| + TP7) | 1.50704 |
| HIF721 | 0.67378 | HIF721/HOI | 0.17227 | SGI721 | 0.03541 | \|SGI721\|/(\|SGI721\| + TP7) | 0.06898 |

The Fifth Embodiment (Embodiment 5)

Figure 5A:
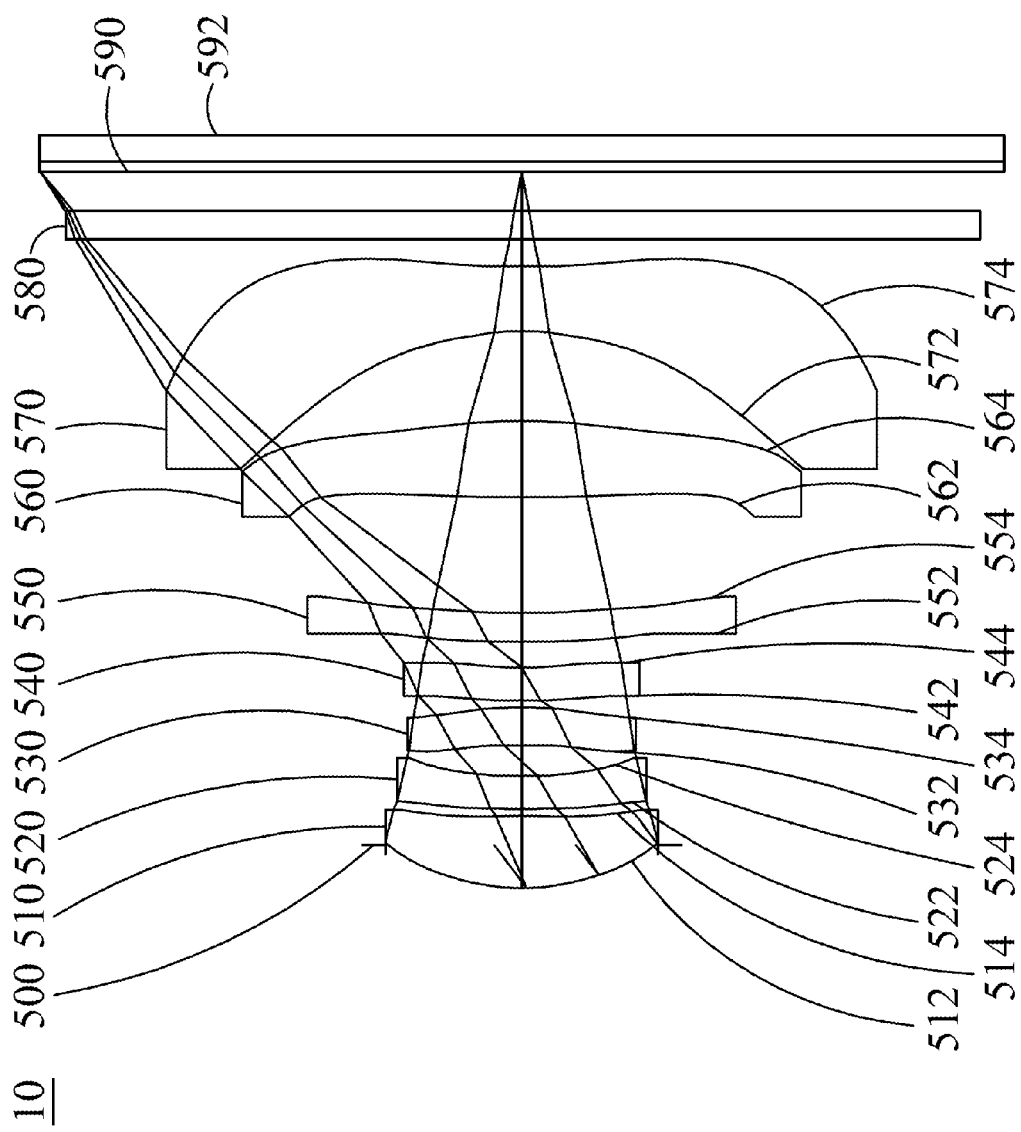
FIG. 5A is a schematic view of the optical image capturing system according to the fifth embodiment of the present application.
Figure 5B:
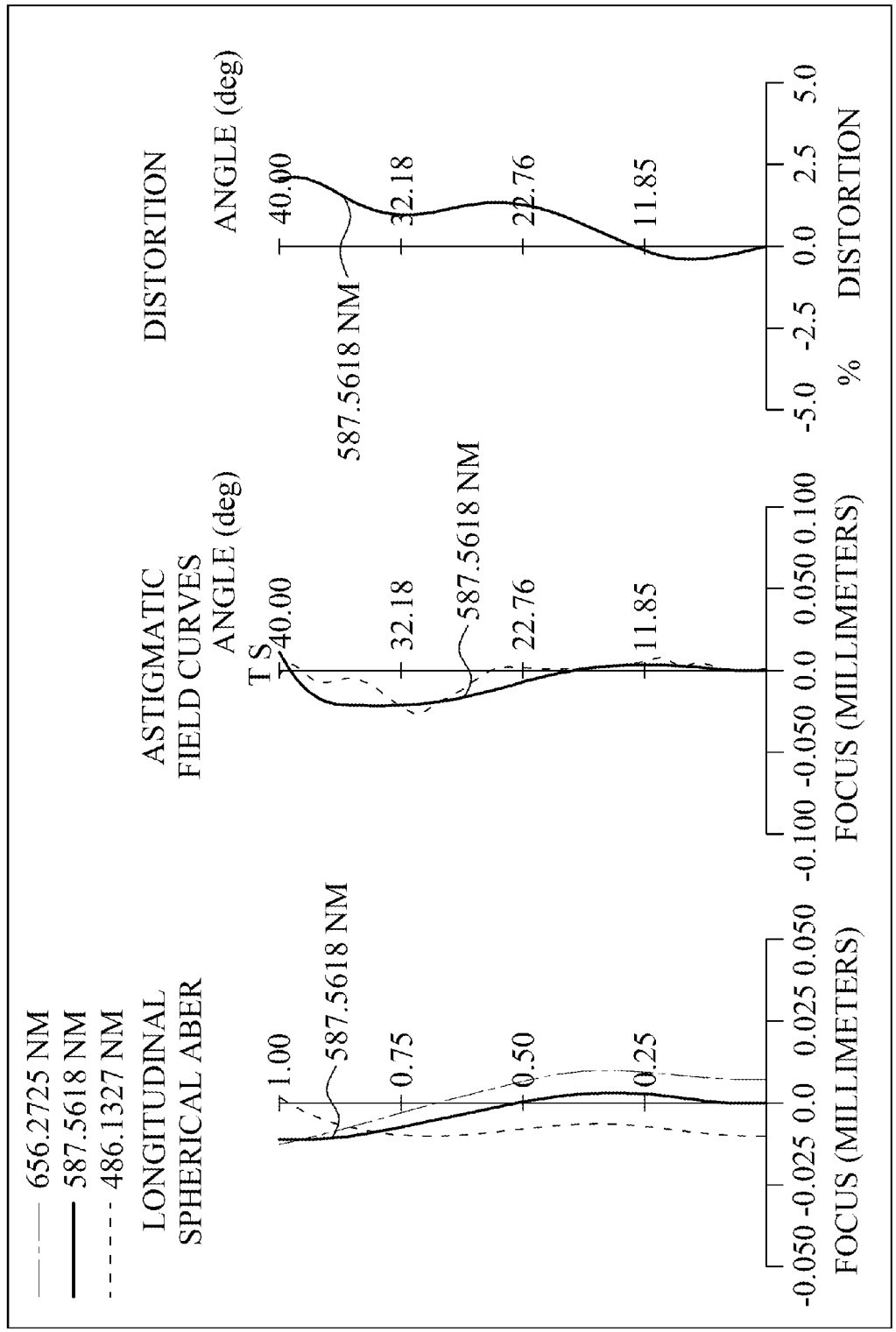
FIG. 5B is longitudinal spherical aberration curves, astigmatic field curves, and an optical distortion grid of the optical image capturing system in the order from left to right according to the fifth embodiment of the present application.
Figure 5C:
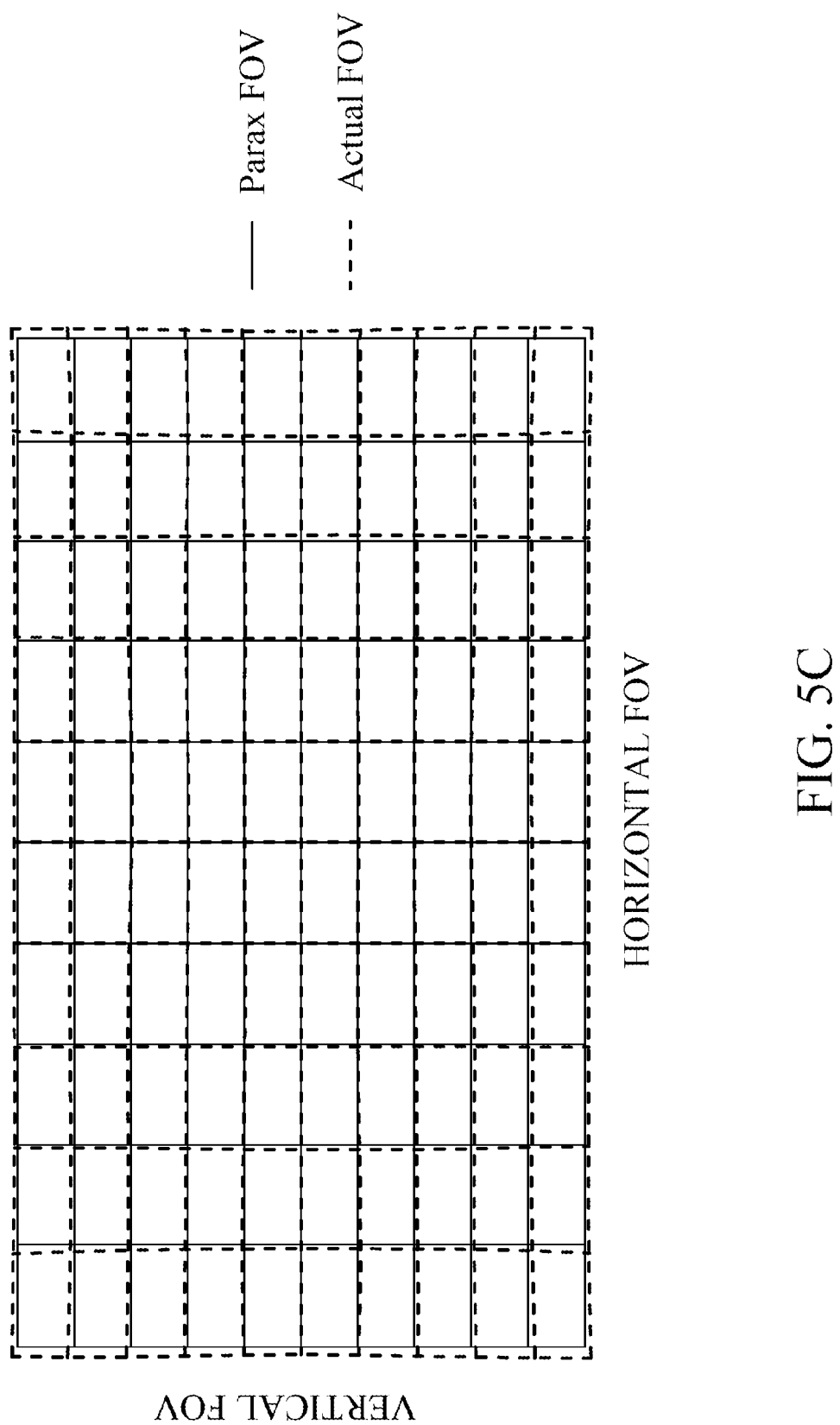
FIG. 5C is a TV distortion grid of the optical image capturing system according to the fifth embodiment of the present application.

Please refer to FIG. 5A, FIG. 5B and FIG. 5C, FIG. 5A is a schematic view of the optical image capturing system according to the fifths embodiment of the present application, FIG. 5B is longitudinal spherical aberration curves, astigmatic field curves, and an optical distortion curve of the optical image capturing system in the order from left to right according to the fifth embodiment of the present application, and FIG. 5C is a TV distortion grid of the optical image capturing system according to the fifth embodiment of the present application. As shown in FIG. 5A, sequentially arranged from an object side to an image side, the optical image capturing system includes a first lens element 510, an aperture stop 500, a second lens element 520, a third lens element 530, a fourth lens element 540, a fifth lens element 550, a sixth lens element 560, a seventh lens element 570, an IR filter 580, an image plane 590, and an image sensing device 592.

The first lens element 510 has positive refractive power and it is made of plastic material. The first lens element 510 has a convex object-side surface 512 and a concave image-side surface 514, and both of the object-side surface 512 and the image-side surface 514 are aspheric.

The second lens element 520 has negative refractive power and it is made of plastic material. The second lens element 520 has a convex object-side surface 522 and a concave image-side surface 524, and both of the object-side surface 522 and the image-side surface 524 are aspheric. The has object-side surface 522 two inflection points.

The third lens element 530 has positive refractive power and it is made of plastic material. The third lens element 530 has a concave object-side surface 532 and a convex image-side surface 534, and both of the object-side surface 532 and the image-side surface 534 are aspheric and have one inflection point.

The fourth lens element 540 has negative refractive power and it is made of plastic material. The fourth lens element 540 has a convex object-side surface 542 and a concave image-side surface 544, and both of the object-side surface 542 and the image-side surface 544 are aspheric and have two inflection points.

The fifth lens element 550 has positive refractive power and it is made of plastic material. The fifth lens element 550 has a convex object-side surface 552 and a concave image-side surface 554 and both of the object-side surface 552 and the image-side surface 554 are aspheric and have one inflection point.

The sixth lens element 560 has positive refractive power and it is made of plastic material. The sixth lens element 560 has a concave object-side surface 562 and a concave image-side surface 564. The object-side surface 562 has one inflection point and the image-side surface 564 has two inflection points. Hereby, the incident angle of the sixth lens element in each viewing field may be effectively adjusted so as to improve the aberration.

The seventh lens element 570 has negative refractive power and it is made of plastic material. The seventh lens element 570 has a convex object-side surface 572 and a concave image-side surface 574. Hereby, the back focal length is reduced for keeping the miniaturization, to miniaturize the lens element effectively. In addition, the object-side surface 572 has two inflection points and the image-side surface 574 has one inflection point, such that the angle of incident with incoming light from an off-axis view field can be suppressed effectively and the aberration in the off-axis view field can be corrected further.

The IR filter 580 is made of glass material without affecting the focal length of the optical image capturing system and it is disposed between the seventh lens element 570 and the image plane 590 without affecting the focal length of the optical image capturing system.

In the fifth embodiment of the optical image capturing system, focal lengths from the second lens element 520 to the sixth lens element 560 are f2, f3, f4, f5 and f6, respectively. The following relation is satisfied: |f2|+|f3|+|f4|+|f5|+|f6|=116.2046 mm, |f1|+|f7|=6.0808 mm and |f2|+|f3|+|f4|+|f5|+|f6|>|f1|+|f7|.

In the fifth embodiment of the optical image capturing system, a central thickness of the sixth lens element 560 on the optical axis is TP6. A central thickness of the seventh lens element 570 on the optical axis is TP4. The following relations are satisfied: TP6=0.5304 mm and TP7=0.4476 mm.

In the fifth embodiment of the optical image capturing system, focal lengths of the first lens element 510, the third lens element 530, the fifth lens element 550 and the sixth lens element 560 are f1, f3, f5 and f6, respectively. A sum of focal lengths of all lens elements with positive refractive power is ΣPP. The following relations are satisfied: ΣPP=f1+f3+f5+f6=81.4756 mm and f1/(f1+f3+f5+f6)=0.0413. Hereby, it's favorable for allocating the positive refractive power of the first lens element 510 to others positive lens elements and the significant aberrations generated in the process of moving the incident light can be suppressed.

In the fifth embodiment of the optical image capturing system, focal lengths of the second lens element 520, the fourth lens element 540 and the seventh lens element 570 are f2, f4 and f7, respectively. A sum of focal lengths of all lens elements with negative refractive power is ΣNP. The following relations are satisfied: ΣNP=f2+f4+f7=−41.2341 mm and f7/(f2+f4+f7)=0.0658. Hereby, it's favorable for allocating the negative refractive power of the seventh lens element 570 to others negative lens elements.

In the fifth embodiment of the optical image capturing system, a distance perpendicular to the optical axis between a critical point on the object-side surface 572 of the seventh lens element and the optical axis is HVT71. A distance perpendicular to the optical axis between a critical point on the image-side surface 574 of the seventh lens element and the optical axis is HVT72. The following relations are satisfied: HVT71=0 mm, HVT72=1.05977 mm and HVT71/HVT72=0.

Please refer to the following Table 9 and Table 10.

The detailed data of the optical image capturing system of the fifth embodiment is as shown in Table 9.

TABLE 9

Data of the optical image capturing system
f = 4.5869 mm, f/HEP = 2.4, HAF = 36 deg

| Surface# | | Curvature Radius | Thickness | Material | Index | Abbe # | Focal length |
|---|---|---|---|---|---|---|---|
| 0 | Object | Plano | Plano | | | | |
| 1 | Ape. stop | Plano | −0.30194 | | | | |
| 2 | Lens 1 | 1.67885 | 0.502569 | Plastic | 1.565 | 58 | 3.3859 |
| 3 | | 12.71698 | 0.05 | | | | |
| 4 | Lens 2 | 5.38574 | 0.23 | Plastic | 1.65 | 21.4 | −7.1855 |
| 5 | | 2.44192 | 0.21546 | | | | |
| 6 | Lens 3 | −3.31318 | 0.267964 | Plastic | 1.514 | 56.8 | 16.1775 |
| 7 | | −2.43029 | 0.05 | | | | |
| 8 | Lens 4 | 4.17348 | 0.23 | Plastic | 1.607 | 26.6 | −31.321 |
| 9 | | 3.34488 | 0.18252 | | | | |
| 10 | Lens 5 | 7.24726 | 0.204591 | Plastic | 1.65 | 21.4 | 56.358 |
| 11 | | 8.96491 | 0.811146 | | | | |
| 12 | Lens 6 | 57.40191 | 0.530414 | Plastic | 1.514 | 56.8 | 6.4721 |
| 13 | | −3.5003 | 0.628252 | | | | |
| 14 | Lens 7 | −2.47689 | 0.447587 | Plastic | 1.514 | 56.8 | −2.7276 |
| 15 | | 3.38613 | 0.2 | | | | |
| 16 | IR filter | Plano | 0.2 | | 1.517 | 64.2 | |
| 17 | | Plano | 0.27791 | | | | |
| 18 | Image plane | Plano | | | | | |

Reference wavelength (d-line) = 587.5 nm

As for the parameters of the aspheric surfaces of the fifth embodiment, reference is made To Table 10.

TABLE 10

Aspheric Coefficients

| Surface # | 2 | 3 | 4 | 5 | 6 | 7 | 8 |
|---|---|---|---|---|---|---|---|
| k = | −0.19498 | 25.965245 | −24.834588 | −4.835407 | −11.460294 | −14.363279 | −50 |
| A4 = | 8.68431E−03 | 2.06667E−02 | −5.42623E−03 | 1.02033E−02 | 9.75389E−02 | 3.11015E−02 | −6.55395E−02 |
| A6 = | 2.05199E−03 | −1.55116E−02 | −4.57020E−03 | 1.60935E−02 | −5.86134E−03 | 8.04270E−02 | −9.07258E−03 |
| A8 = | 5.46113E−03 | 1.50417E−02 | −1.68343E−02 | −2.02109E−02 | 1.02915E−01 | 1.02785E−02 | −6.61190E−03 |
| A10 = | −1.77602E−03 | −6.27543E−03 | 1.30266E−02 | 1.81509E−02 | −4.33460E−02 | 1.56694E−02 | 1.72045E−02 |
| A12 = | | | | | | | |
| A14 = | | | | | | | |

TABLE 10-continued

Aspheric Coefficients

| Surface # | 9 | 10 | 11 | 12 | 13 | 14 | 15 |
|---|---|---|---|---|---|---|---|
| k = | −31.574844 | 9.635245 | 8.366551 | −50 | −22.578376 | −0.421387 | −50 |
| A4 = | −7.29455E−02 | 8.86110E−04 | −9.10165E−04 | 3.54135E−02 | 3.89278E−02 | −2.57528E−02 | −3.30133E−02 |
| A6 = | −5.96674E−03 | −1.23165E−02 | 5.36757E−03 | −2.75135E−02 | −1.33720E−02 | 4.52341E−03 | 4.61348E−03 |
| A8 = | −2.29490E−02 | −6.94666E−03 | −2.66396E−03 | 5.09075E−03 | 3.37191E−04 | 2.25092E−04 | −8.64463E−04 |
| A10 = | 2.11657E−02 | 7.53306E−04 | −1.43452E−03 | −9.81173E−04 | 8.08761E−05 | 8.52708E−06 | 3.11316E−05 |
| A12 = | | 3.22496E−03 | 8.75091E−04 | 5.64122E−05 | 5.48106E−06 | −5.52365E−06 | 4.27694E−06 |
| A14 = | | −1.37062E−03 | −1.59640E−04 | −2.87791E−05 | −2.51294E−06 | 1.10684E−07 | −6.34271E−07 |

In the fifth embodiment, the presentation of the aspheric surface formula is similar to that in the first embodiment. Besides, the definitions of parameters in following tables are equal to those in the first embodiment, so the repetitious details need not be given here.

The following content may be deduced from Table 9 and Table 10.

Fifth embodiment (Primary reference wavelength: 587.5 nm)

| InRS11 | InRS12 | InRS21 | InRS22 | InRS31 | InRS32 |
|---|---|---|---|---|---|
| 0.05028 | 0.06294 | 0.20004 | 0.03452 | 0.01205 | 0.01234 |
| InRS41 | InRS42 | InRS51 | InRS52 | InRS61 | InRS62 |
| −0.00301 | 0.01229 | 0.09186 | −0.56368 | −0.86436 | −1.34074 |
| InRS71 | InRS72 | (|InRS52| + |InRS61|)/IN56 | | (|InRS62| + |InRS71|)/IN67 | |
| −1.64816 | 4.72594 | 1.76051 | | 4.75749 | |
| HVT61 | HVT62 | HVT71 | HVT72 | HVT72/HOI | HVT72/HOS |
| 1.09562 | 0 | 0.00000 | 1.05984 | 0.27106 | 0.21079 |
| InRSO | InRSI | Σ|InRS| | Σ|InRS|/InTL | Σ|InRS|/HOS | |

| 2.86976 | 6.75244 | 9.62220 | 2.46092 | 4.52044 | |
|---|---|---|---|---|---|
| (|InRS61| + |InRS62| + |InRS71| + |InRS72|)/InTL | | | (|InRS61| + |InRS62| + |InRS71| + |InRS72|)/HOS | | |
| 1.97200 | | | 1.70632 | | |
| |f/f1| | |f/f2| | |f/f3| | |f/f4| | |f/f5| | |f/f6| |
| 1.35823 | 0.64554 | 0.28439 | 0.14760 | 0.08236 | 0.710601 |
| |f/f7| | |f1/f2| | |ODT|% | |TDT|% | |InRS71|/TP7 | |InRS72|/TP7 |
| 1.686314 | 0.47528 | 2.12860 | 1.13713 | 2.99548 | 3.68232 |
| ΣPPR | ΣNPR | ΣPPR/ΣNPR| | ΣPP | ΣNP | f1/ΣPP |
| 2.43559 | 2.47945 | 0.98231 | 81.39657 | −40.77303 | 0.04136 |
| f7/ΣNP | IN12/f | (TP1 + IN12)/TP2 | | (TP7 + IN67)/TP6 | |
| 0.06650 | 0.01094 | 2.4026 | | 2.0285 | |
| HOS | InTL | HOS/HOI | InS/HOS | InTL/HOS | ΣTP/InTL |
| 5.02788 | 4.35050 | 1.28590 | 0.93995 | 0.86528 | 0.55468 |

The following content may be deduced from Table 9 and Table 10.

Related inflection point values of fifth embodiment (Primary reference wavelength: 555 nm)

| HIF211 | 0.70612 | HIF211/HOI | 0.18056 | SGI211 | 0.03977 | |SGI211|/(|SGI211| + TP2) | 0.14742 |
|---|---|---|---|---|---|---|---|
| HIF212 | 0.95319 | HIF212/HOI | 0.24374 | SGI212 | 0.06135 | |SGI212|/(|SGI212| + TP2) | 0.21058 |
| HIF311 | 0.42650 | HIF311/HOI | 0.10906 | SGI311 | −0.02306 | |SGI311|/(|SGI311| + TP3) | 0.09415 |
| HIF321 | 0.47716 | HIF321/HOI | 0.12201 | SGI321 | −0.03940 | |SGI321|/(|SGI321| + TP3) | −0.17236 |
| HIF411 | 0.40381 | HIF411/HOI | 0.10326 | SGI411 | 0.01591 | |SGI411|/(|SGI411| + TP4) | 0.06471 |
| HIF412 | 0.97728 | HIF412/HOI | 0.24990 | SGI412 | 0.01885 | |SGI412|/(|SGI412| + TP4) | 0.07576 |
| HIF421 | 0.42045 | HIF421/HOI | 0.10751 | SGI421 | 0.02150 | |SGI421|/(|SGI421| + TP4) | 0.08548 |
| HIF422 | 1.05585 | HIF422/HOI | 0.26999 | SGI422 | 0.01274 | |SGI422|/(|SGI422| + TP4) | 0.05249 |
| HIF511 | 0.75981 | HIF511/HOI | 0.19429 | SGI511 | 0.03836 | |SGI511|/(|SGI511| + TP5) | 0.15789 |
| HIF521 | 1.13304 | HIF521/HOI | 0.28973 | SGI521 | 0.07512 | |SGI521|/(|SGI521| + TP5) | 0.26856 |
| HIF611 | 0.81831 | HIF611/HOI | 0.20925 | SGI611 | 0.01433 | |SGI611|/(|SGI611| + TP6) | 0.02631 |
| HIF621 | 0.64223 | HIF621/HOI | 0.16422 | SGI621 | −0.04523 | |SGI621|/(|SGI621| + TP6) | −0.09322 |
| HIF622 | 1.06285 | HIF622/HOI | 0.27178 | SGI622 | −0.08716 | |SGI622|/(|SGI622| + TP6) | −0.19662 |
| HIF711 | 1.79916 | HIF711/HOI | 0.46006 | SGI711 | −0.80740 | |SGI711|/(|SGI711| + TP7) | 2.24395 |
| HIF712 | 2.54267 | HIF712/HOI | 0.65018 | SGI712 | −1.32216 | |SGI712|/(|SGI712| + TP7) | 1.51178 |
| HIF721 | 0.51270 | HIF721/HOI | 0.13110 | SGI721 | 0.02939 | |SGI721|/(|SGI721| + TP7) | 0.06162 |

The Sixth Embodiment (Embodiment 6)

Figure 6A:
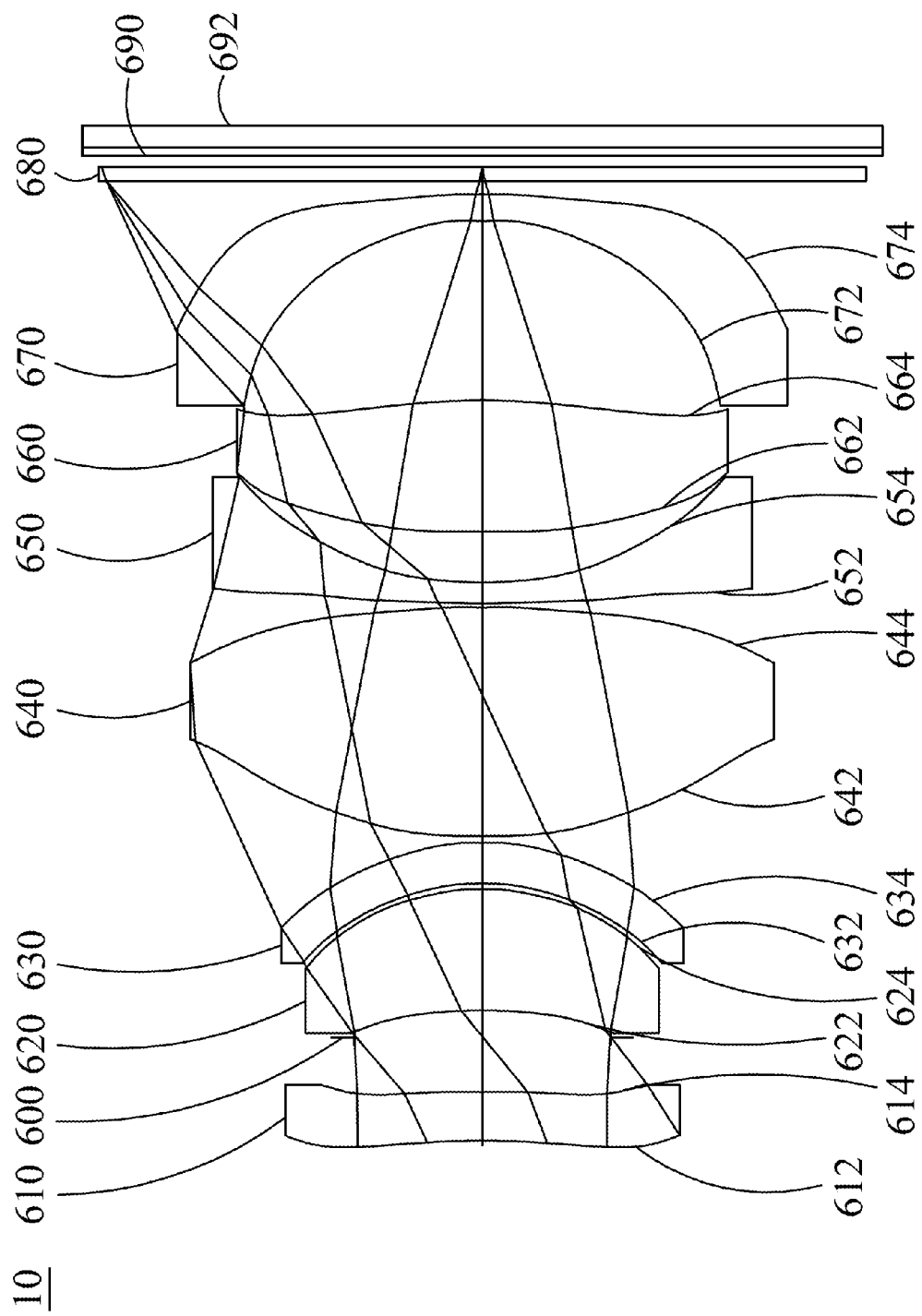
FIG. 6A is a schematic view of the optical image capturing system according to the sixth embodiment of the present application.
Figure 6B:
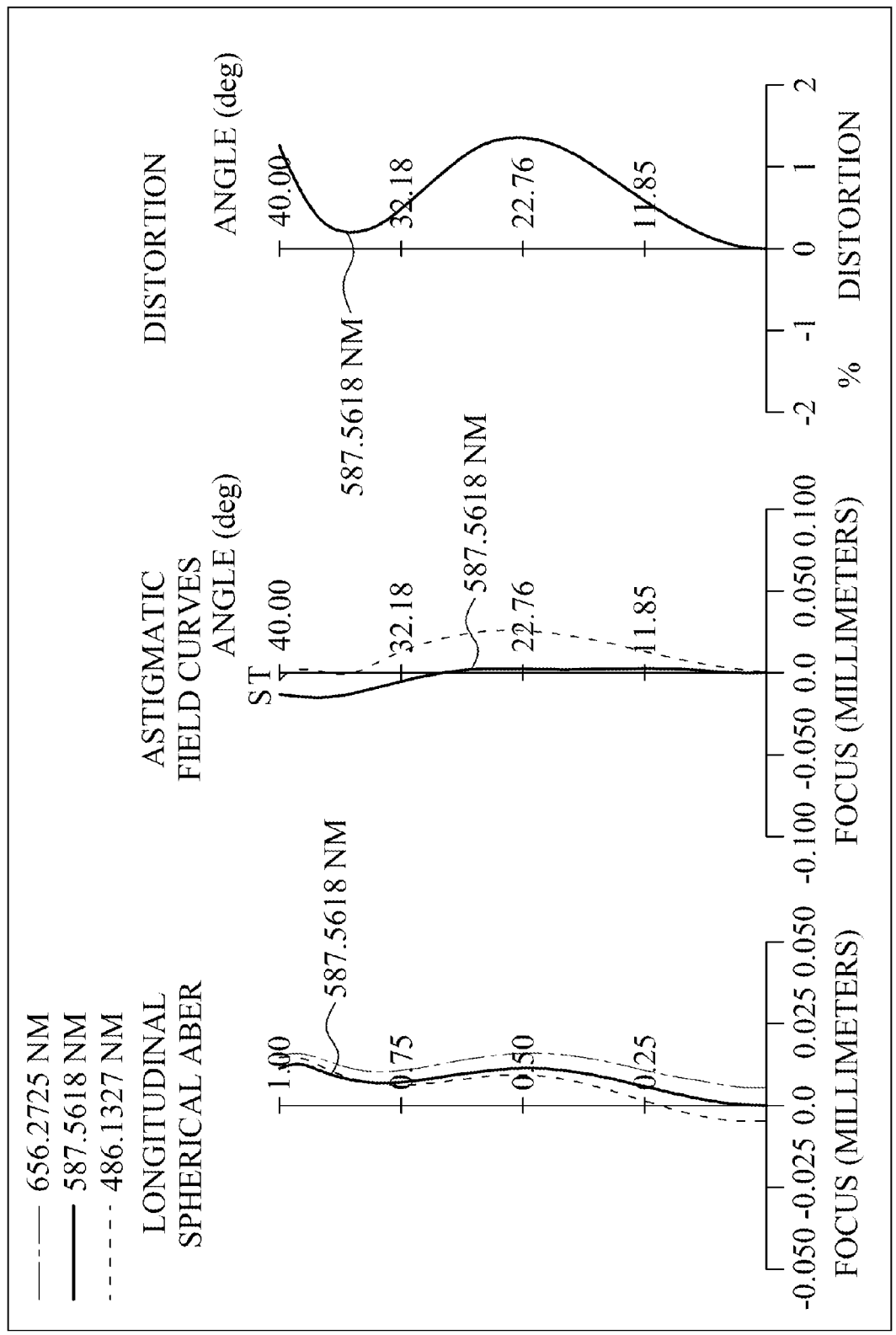
FIG. 6B is longitudinal spherical aberration curves, astigmatic field curves, and an optical distortion grid of the optical image capturing system in the order from left to right according to the sixth embodiment of the present application.
Figure 6C:
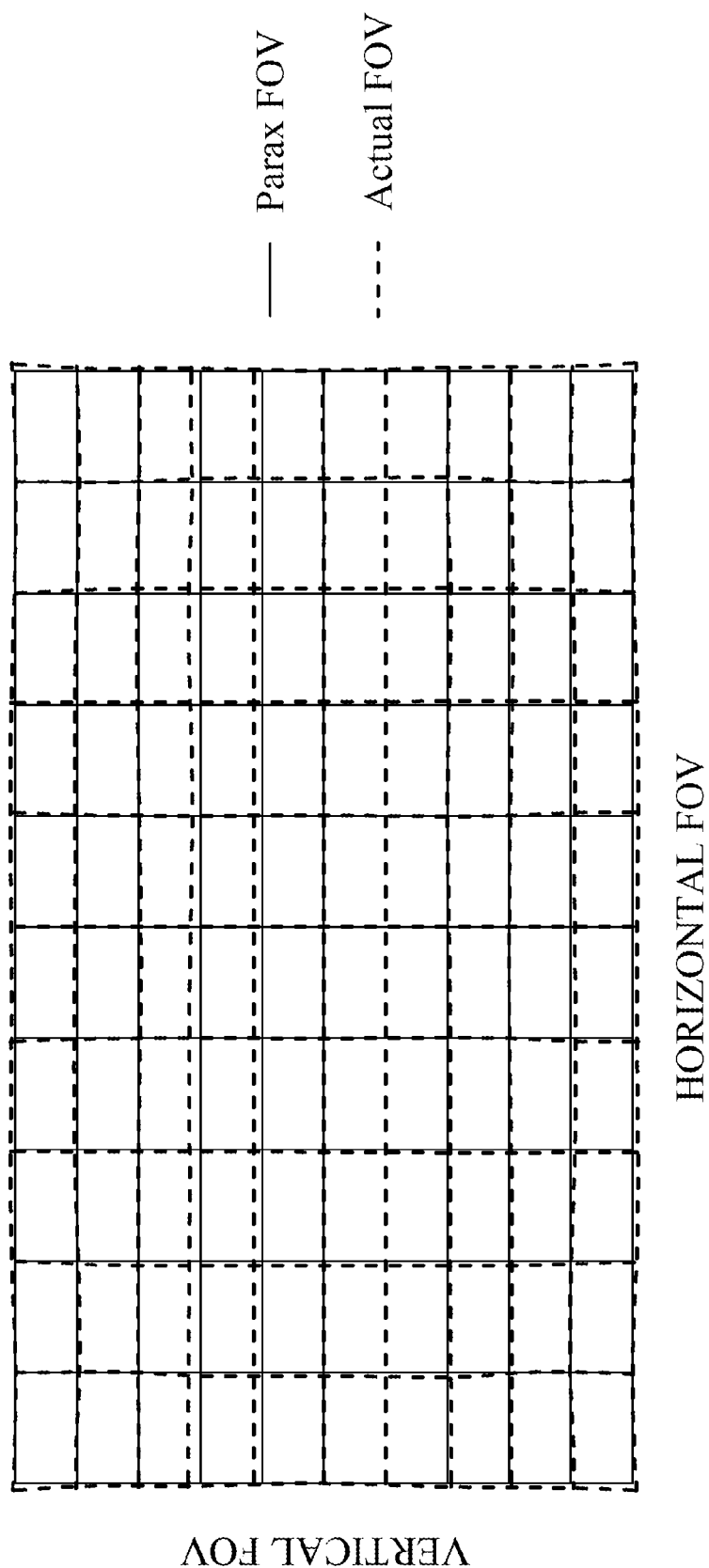
FIG. 6C is a TV distortion grid of the optical image capturing system according to the sixth embodiment of the present application.

Please refer to FIG. 6A, FIG. 6B and FIG. 6C, FIG. 6A is a schematic view of the optical image capturing system according to the sixth embodiment of the present application, FIG. 6B is longitudinal spherical aberration curves, astigmatic field curves, and an optical distortion curve of the optical image capturing system in the order from left to right according to the sixth embodiment of the present application, and FIG. 6C is a TV distortion grid of the optical image capturing system according to the sixth embodiment of the present application. As shown in FIG. 6A, sequentially arranged from an object side to an image side, the optical image capturing system includes a first lens element 610, an aperture stop 600, a second lens element 620, a third lens element 630, a fourth lens element 640, a fifth lens element 650, a sixth lens element 660, a seventh lens element 670, an IR filter 680, an image plane 690, and an image sensing device 692.

The first lens element 610 has negative refractive power and it is made of plastic material. The first lens element 610 has a concave object-side surface 612 and a convex image-side surface 614, and both of the object-side surface 612 and the image-side surface 614 are aspheric and have one inflection point.

The second lens element 620 has positive refractive power and it is made of plastic material. The second lens element 620 has a concave object-side surface 622 and a convex image-side surface 624, and both of the object-side surface 622 and the image-side surface 624 are aspheric.

The third lens element 630 has negative refractive power and it is made of plastic material. The third lens element 630 has a concave object-side surface 632 and a convex image-side surface 634, and both of the object-side surface 632 and the image-side surface 634 are aspheric.

The fourth lens element 640 has positive refractive power and it is made of plastic material. The fourth lens element 640 has a convex object-side surface 642 and a convex image-side surface 644, and both of the object-side surface 642 and the image-side surface 644 are aspheric. The object-side surface 642 has one inflection point.

The fifth lens element 650 has negative refractive power and it is made of plastic material. The fifth lens element 650 has a convex object-side surface 652 and a concave image-side surface 654 and both of the object-side surface 652 and the image-side surface 654 are aspheric. The object-side surface 652 has two inflection points.

The sixth lens element 660 has positive refractive power and it is made of plastic material. The sixth lens element 660 has a convex object-side surface 662 and a convex image-side surface 664. The image-side surface 664 has one inflection point. Hereby, the incident angle of the sixth lens element 660 in each viewing field may be effectively adjusted so as to improve the aberration.

The seventh lens element 670 has negative refractive power and it is made of plastic material. The seventh lens element 670 has a concave object-side surface 672 and a convex image-side surface 674. Hereby, the back focal length is reduced for keeping the miniaturization, to miniaturize the lens element effectively. In addition, the angle of incident with incoming light from an off-axis view field can be suppressed effectively and the aberration in the off-axis view field can be corrected further.

The IR filter 680 is made of glass material without affecting the focal length of the optical image capturing system and it is disposed between the seventh lens element 670 and the image plane 690 without affecting the focal length of the optical image capturing system.

In the sixth embodiment of the optical image capturing system, focal lengths from the second lens element 620 to the sixth lens element 660 are f2, f3, f4, f5 and f6, respectively. The following relations are satisfied: $|f2|+|f3|+|f4|+|f5|+|f6|=86.3084$ mm and $|f1|+|f7|=246.7079$ mm.

In the sixth embodiment of the optical image capturing system, a central thickness of the sixth lens element 660 on the optical axis is TP6. A central thickness of the seventh lens element 670 on the optical axis is TP7. The following relations are satisfied: TP6=1.3445 mm and TP7=0.2466 mm.

In the sixth embodiment of the optical image capturing system, focal lengths of the second lens element 620, the fourth lens element 640 and the sixth lens element 660 are f2, f4 and f6, respectively. A sum of focal lengths of all lens elements with positive refractive power is ΣPP. The following relations are satisfied: $\Sigma PP=f2+f4+f6=22.6888$ mm and $f2/(f2+f4+f6)=0.3982$. Hereby, it's favorable for allocating the positive refractive power of the first lens element 610 to others positive lens elements and the significant aberrations generated in the process of moving the incident light can be suppressed.

In the sixth embodiment of the optical image capturing system, focal lengths of the first lens element 610, the third lens element 630, the fifth lens element 650 and the seventh lens element 670 are f1, f3, f5 and f7, respectively. A sum of focal lengths of all lens elements with negative refractive power is ΣNP. The following relations are satisfied: $\Sigma NP=f1+f3+f5+f7=-310.3275$ mm and $f7/(f1+f3+f5+f7)=0.0181$. Hereby, it's favorable for allocating the negative refractive power of the seventh lens element 670 to others negative lens elements.

In the sixth embodiment of the optical image capturing system, a distance perpendicular to the optical axis between a critical point on the object-side surface 672 of the seventh lens element and the optical axis is HVT71. A distance perpendicular to the optical axis between a critical point on the image-side surface 674 of the seventh lens element and the optical axis is HVT72. The following relations are satisfied: HVT71=0 mm and HVT72=0 mm.

Please refer to the following Table 11 and Table 12. The detailed data of the optical image capturing system of the sixth embodiment is as shown in Table 11.

TABLE 11

Data of the optical image capturing system
f = 4.5959 mm, f/HEP = 1.8, HAF = 40 deg

| Surface # | | Curvature Radius | Thickness | Material | Index | Abbe # | Focal length |
|---|---|---|---|---|---|---|---|
| 0 | Object | Plano | Plano | | | | |
| 1 | Lens 1 | −7.63591 | 0.511837 | Plastic | 1.607 | 26.6 | −241.082 |

TABLE 11-continued

Data of the optical image capturing system
f = 4.5959 mm, f/HEP = 1.8, HAF = 40 deg

| Surface # | | Curvature Radius | Thickness | Material | Index | Abbe # | Focal length |
|---|---|---|---|---|---|---|---|
| 2 | | −8.26026 | 0.563369 | | | | |
| 3 | Ape. stop | Plano | 0.272998 | | | | |
| 4 | Lens 2 | −4.10286 | 1.24021 | Plastic | 1.565 | 58 | 9.0344 |
| 5 | | −2.52281 | 0.057642 | | | | |
| 6 | Lens 3 | −2.43813 | 0.416132 | Plastic | 1.65 | 21.4 | −57.2659 |
| 7 | | −2.78444 | 0.05 | | | | |
| 8 | Lens 4 | 4.24762 | 2.367965 | Plastic | 1.565 | 58 | 6.0701 |
| 9 | | −14.2246 | 0.05 | | | | |
| 10 | Lens 5 | 20.25813 | 0.2 | Plastic | 1.65 | 21.4 | −6.3537 |
| 11 | | 3.41724 | 0.527712 | | | | |
| 12 | Lens 6 | 9.26516 | 1.344486 | Plastic | 1.565 | 58 | 7.5843 |
| 13 | | −7.5548 | 1.851024 | | | | |
| 14 | Lens 7 | −2.69118 | 0.246626 | Plastic | 1.607 | 26.6 | −5.6257 |
| 15 | | −13.139 | 0.15 | | | | |
| 16 | IR filter | Plano | 0.15 | | 1.517 | 64.2 | |
| 17 | | Plano | 0.000004 | | | | |
| 18 | Image Plane | Plano | | | | | |

Reference wavelength (d-line) = 587.5 nm

As for the parameters of the aspheric surfaces of the sixth embodiment, reference is made to Table 12.

TABLE 12

Aspheric Coefficients

| Surface # | 1 | 2 | 4 | 5 | 6 | 7 | 8 |
|---|---|---|---|---|---|---|---|
| k = | −33.312145 | −50 | −0.332792 | 0.043896 | −0.093202 | 0.285506 | −0.380699 |
| A4 = | 1.26272E−02 | 2.03915E−02 | 4.18954E−03 | 3.10064E−03 | 2.07007E−04 | 1.94950E−03 | −1.32802E−03 |
| A6 = | 1.29612E−03 | 1.44214E−03 | −4.86569E−03 | −1.05746E−03 | 1.64521E−03 | 1.34900E−03 | 1.29019E−04 |
| A8 = | −3.52645E−04 | −3.02866E−05 | 7.11820E−04 | 1.31428E−04 | −5.65034E−05 | −1.42647E−05 | 1.07233E−06 |
| A10 = | 3.52569E−05 | 1.35388E−05 | −3.28977E−04 | −1.63946E−04 | −1.51193E−04 | −1.86006E−05 | −2.06880E−06 |
| A12 = | | | | | | | |
| A14 = | | | | | | | |

| Surface # | 9 | 10 | 11 | 12 | 13 | 14 | 15 |
|---|---|---|---|---|---|---|---|
| k = | 10.93499 | 19.290896 | −0.0723 | 3.233085 | −11.778797 | 0.194169 | −50 |
| A4 = | −1.67996E−03 | 1.12998E−03 | −1.31585E−03 | 1.93655E−03 | 2.30335E−03 | 2.04449E−03 | 1.59526E−03 |
| A6 = | −1.31982E−04 | −1.90833E−04 | 1.67690E−04 | 3.82824E−04 | 6.90805E−04 | 8.69537E−04 | −1.68389E−03 |
| A8 = | −3.19390E−06 | −3.15177E−05 | 4.13457E−05 | 1.75911E−05 | 1.48710E−05 | −2.69239E−04 | 4.04352E−05 |
| A10 = | 7.41371E−07 | −2.34346E−06 | −1.30149E−06 | 1.94706E−06 | −5.99541E−06 | 2.89014E−05 | 9.78632E−07 |
| A12 = | | 6.20400E−08 | −1.68471E−07 | 1.15194E−07 | −5.61580E−07 | 1.71797E−06 | −7.92755E−08 |
| A14 = | | 6.93550E−08 | −1.77237E−08 | 1.45320E−08 | 1.94347E−07 | −7.23500E−07 | −1.35502E−08 |

The presentation of the aspheric surface formula in the sixth embodiment is similar to that in the first embodiment. Besides the definitions of parameters in following tables are equal to those in the first embodiment so the repetitious details need not be given here.

The following content may be deduced from Table 11 and Table 12.

Sixth embodiment (Primary reference wavelength: 587.5 nm)

| InRS11 | InRS12 | InRS21 | InRS22 | InRS31 | InRS32 |
|---|---|---|---|---|---|
| 0.07548 | −0.23701 | −0.81027 | −0.80894 | −0.88036 | 1.00117 |

| InRS41 | InRS42 | InRS51 | InRS52 | InRS61 | InRS62 |
|---|---|---|---|---|---|
| −0.57412 | 0.13937 | 1.08116 | 0.60529 | −0.09457 | −1.89063 |

Sixth embodiment (Primary reference wavelength: 587.5 nm)

| InRS71 | InRS72 | (|InRS52| + |InRS61|)/ IN56 | (|InRS62| + |InRS71|)/ IN67 |
|---|---|---|---|
| −1.39893 | 8.92248 | 1.32622 | 1.77716 |

| HVT61 | HVT62 | HVT71 | HVT72 | HVT72/ HOI | HVT72/ HOS |
|---|---|---|---|---|---|
| 0 | 2.00121 | 0.00000 | 0.00000 | 0.00000 | 0.00000 |

| InRSO | InRSI | Σ|InRS| | Σ|InRS|/ InTL | Σ|InRS|/ HOS |
|---|---|---|---|---|
| 4.91489 | 13.60489 | 18.51978 | 4.73652 | 13.34749 |

-continued

Sixth embodiment (Primary reference wavelength: 587.5 nm)

| (|InRS61| + |InRS62| + |InRS71| + |InRS72|)/InTL | (|InRS61| + |InRS62| + |InRS71| + |InRS72|)/HOS | | | | |
|---|---|---|---|---|---|
| 1.26872 | 1.23095 | | | | |
| |f/f1| | |f/f2| | |f/f3| | |f/f4| | |f/f5| | |f/f6| |
| 0.01914 | 0.51005 | 0.08048 | 0.75872 | 0.72868 | 0.6072628 |
| |f/f7| | |f1/f2| | |ODT|% | |TDT|% | |InRS71|/TP7 | |InRS72|/TP7 |
| 0.821657 | 26.65124 | 1.38751 | 1.05531 | 7.66598 | 5.67227 |
| ΣPPR | ΣNPR | ΣPPR/ΣNPR| | ΣPP | ΣNP | f1/ΣPP |
| 1.87604 | 1.64995 | 1.13703 | 22.61467 | −308.85430 | 0.39806 |
| f7/ΣNP | IN12/f | (TP1 + IN12)/TP2 | | (TP7 + IN67)/TP6 | |
| 0.01809 | 0.18215 | 1.0871 | | 1.5601 | |
| HOS | InTL | HOS/HOI | InS/HOS | InTL/HOS | ΣTP/InTL |
| 9.99768 | 9.70000 | 2.55695 | 0.89246 | 0.97023 | 0.65229 |

The following content may be deduced from Table 11 and Table 12.

Related inflection point values of sixth embodiment (Primary reference wavelength: 555 nm)

| HIF111 | 0.72939 | HIF111/HOI | 0.18649 | SGI111 | −0.02885 | | SGI111 |/(| SGI111 | + TP1) | −0.05973 |
|---|---|---|---|---|---|---|---|
| HIF121 | 0.58079 | HIF121/HOI | 0.14849 | SGI121 | −0.01694 | | SGI121 |/(| SGI121 | + TP1) | −0.01385 |
| HIF411 | 2.65312 | HIF411/HOI | 0.67834 | SGI411 | 0.83186 | | SGI411 |/(| SGI411 | + TP4) | 0.25997 |
| HIF511 | 1.72480 | HIF511/HOI | 0.44099 | SGI511 | 0.07849 | | SGI511 |/(| SGI511 | + TP5) | 0.28185 |
| HIF512 | 2.48375 | HIF512/HOI | 0.63504 | SGI512 | 0.12469 | | SGI512 |/(| SGI512 | + TP5) | 0.38403 |
| HIF621 | 1.23611 | HIF621/HOI | 0.31604 | SGI621 | −0.08685 | | SGI621 |/(| SGI621 | + TP6) | −0.06906 |

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An optical image capturing system, from an object side to side to an image side, sequentially comprising:
a first lens element with positive refractive power;
a second lens element with refractive power;
a third lens element with refractive power;
a fourth lens element with refractive power;
a fifth lens element with refractive power;
a sixth lens element with positive refractive power;
a seventh lens element with negative refractive power; and
an image plane;
wherein the optical image capturing system consists of the seven lens elements with refractive power, at least two lens elements among the seven lens elements respectively have at least one inflection point on at least one surface thereof, at least one of the first through seventh lens element has positive refractive power, an object-side surface and an image-side surface of the seventh lens element are aspheric, focal lengths of the first through seventh lens elements are f1, f2, f3, f4, f5, f6 and f7 respectively, a focal length of the optical image capturing system is an f, an entrance pupil diameter of the optical image capturing system is HEP, a distance from an object-side surface of the first lens element to the image plane is HOS, a distance on an optical axis from the object-side surface of the first lens element to the image-side surface of the seventh lens element is InTL, a sum of an absolute value of each distance in the parallel with the optical axis from a maximum effective half diameter on an object-side surface of each of the seven lens elements to an axial point on the object-side surface of each of the seven lens elements is InRSO, a sum of an absolute value of each distance in the parallel with the optical axis from a maximum effective half diameter on an image-side surface of each of the seven lens elements to an axial point on the image-side surface of each of the seven lens elements is InRSI, a sum of InRSO and InRSI is Σ|InRS|, and the following relations are satisfied: 1.2≤f/HEP≤6.0, 0.5≤HOS/f≤5.0, and 0<Σ|InRS|/InTL≤5.

2. The optical image capturing system of claim 1, wherein TV distortion for image formation in the optical image capturing system is TDT, and the following relation is satisfied: |TDT|<60%.

3. The optical image capturing system of claim 1, wherein optical distortion for image formation in the optical image capturing system is ODT, and the following relation is satisfied: |ODT|<50%.

4. The optical image capturing system of claim 1, wherein a refractive index of the first lens element is Nd1, a refractive index of the second lens element is Nd2, and the following relation is satisfied: Nd2<Nd1.

5. The optical image capturing system of claim 1, wherein half of a maximal view angle of the optical image capturing system is HAF, and the following relation is satisfied: 15 deg≤HAF≤70 deg.

6. The optical image capturing system of claim 1, wherein the first lens element has positive refractive power and the sixth lens element has positive refractive power.

7. The optical image capturing system of claim 1, wherein the optical image capturing system satisfies the following relation: 0.45≤InTL/HOS≤0.9.

8. The optical image capturing system of claim 1, wherein a total central thickness of all lens elements with refractive power on the optical axis is ΣTP, and the following relation is satisfied: 0.45≤ΣTP/InTL≤0.95.

9. The optical image capturing system of claim 1, further comprising an aperture stop and a distance from the aperture stop to the image plane is InS, and the following relation is satisfied: 0.5ΣInS/HOS≤1.1.

10. An optical image capturing system, from an object side to an image side, sequentially comprising:
a first lens element with positive refractive power;
a second lens element with refractive power;
a third lens element with refractive power;
a fourth lens element with refractive power;

a fifth lens element with refractive power;
a sixth lens element with positive refractive power;
a seventh lens element with negative refractive power; and
an image plane;
wherein the optical image capturing system consists of the seven lens elements with refractive power, at least two lens elements among the seven lens elements respectively have at least one inflection point on at least one surface thereof, at least one of the second through seventh lens elements has positive refractive power, an object-side surface and an image-side surface of the seventh lens element are aspheric, focal lengths of the first through seventh lens elements are f1, f2, f3, f4, f5, f6 and f7 respectively, a focal length of the optical image capturing system is f, an entrance pupil diameter of the optical image capturing system is HEP, a distance from an object-side surface of the first lens element to the image plane is HOS, a distance on an optical axis from the object-side surface of the first lens element to the image-side surface of the seventh lens element is InTL, a sum of an absolute value of each distance in parallel with the optical axis from a maximum effective half diameter on an object-side surface of each of the seven lens elements to an axial point on the object-side surface of each of the seven lens elements is InRSO, a sum of an absolute value of each distance in parallel with the optical axis from a maximum effective half diameter on an image-side surface of each of the seven lens elements to an axial point on the image-side surface of each of the seven lens elements is InRSI, a sum of InRSO and InRSI is Σ|InRSI|, and the following relations are satisfied: 1.2≤f/HEP≤6.0, 0.5≤HOS/f≤5.0, and 0<Σ|InRSI|/InTL≤5.

11. The optical image capturing system of claim 10, wherein the seventh lens element has negative refractive power, and at least one surface of at least one of the sixth and the seventh lens elements has at least one inflection point.

12. The optical image capturing system of claim 10, wherein a ratio f/fp of the focal length f of the optical image capturing system to a focal length fp of each of lens elements with positive refractive power is PPR and the following relation is satisfied: 0.5≤ΣPPR≤10.

13. The optical image capturing system of claim 10, wherein TV distortion and optical distortion for image formation in the optical image capturing system are TDT and ODT, respectively, and the following relations are satisfied: |TDT|<1.5% and |ODT|≤2.5%.

14. The optical image capturing system of claim 10, wherein the second lens element has negative refractive power and the sixth lens element has positive refractive power.

15. The optical image capturing system of claim 10, wherein the optical image capturing system satisfies the following relation: 0 mm<Σ|InRSI|≤20 mm.

16. The optical image capturing system of claim 10, wherein a distance in parallel with an optical axis from a maximum effective half diameter on the object-side surface of the sixth lens element to an axial point on the object-side surface of the sixth lens element is InRS61, a distance in parallel with the optical axis from a maximum effective half diameter on the image-side surface of the sixth lens element to an axial point on the image-side surface of the sixth lens element is InRS62, a distance in parallel with the optical axis from a maximum effective half diameter on the object-side surface of the seventh lens element to an axial point on the object-side surface of the seventh lens element is InRS71, a distance in parallel with an optical axis from a maximum effective half diameter on the image-side surface of the seventh lens element to an axial point on the image-side surface of the seventh lens element is InRS72, and the following relation is satisfied: 0 mm<|InRS61|+|InRS62|+|InRS71|+|InRS72|≤5 mm.

17. The optical image capturing system of claim 16, wherein the optical image capturing system satisfies the following relation: 0<(|InRS61|+|InRS62|+|InRS71|+|InRS72|)/InTL≤5.

18. The optical image capturing system of claim 16, wherein the optical image capturing system satisfies the following relation: 0<(|InRS61|+|InRS62|+|InRS71|+|InRS72|)/HOS≤5.

19. The optical image capturing system of claim 10, wherein at least one surface of at least one of the fourth and the fifth lens elements has at least one inflection point.

20. An optical image capturing system, from an object side to an image side, sequentially comprising:
a first lens element with positive refractive power;
a second lens element with refractive power;
a third lens element with refractive power;
a fourth lens element with positive refractive power;
a fifth lens element with refractive power;
a sixth lens element with positive refractive power;
a seventh lens element with negative refractive power and at least one surface of an object side surface and an image side surface of the seventh lens element having at least one inflection point; and
an image plane;
wherein the optical image capturing system consists of the seven lens elements with refractive power, at least two lens elements of the first through sixth lens elements respectively have at least one inflection point on at least one surface thereof, the object-side surfaces and the image-side surfaces of both the sixth and the seventh lens elements are aspheric, focal lengths of the first through seventh lens elements are f1, f2, f3, f4, f5, f6 and f7 respectively, a focal length of the optical image capturing system is f, an entrance pupil diameter of the optical image capturing system is HEP, half of a maximal view angle of the optical image capturing system is HAF, a distance from an object-side surface of the first lens element to the image plane is HOS, a distance on an optical axis from the object-side surface of the first lens element to the image-side surface of the seventh lens element is InTL, optical distortion and TV distortion for image formation in the optical image capturing system are ODT and TDT respectively, a sum of an absolute value of each distance in parallel with the optical axis from a maximum effective half diameter on an object-side surface of each of the seven lens elements to an axial point on the object-side surface of each of the seven lens elements is InRSO, a sum of an absolute value of each distance in parallel with the optical axis from a maximum effective half diameter on an image-side surface of each of the seven lens elements to an axial point on the image-side surface of each of the seven lens elements is InRSI, a sum of InRSO and InRSI is Σ|InRSI|, and the following relation is satisfied: 1.2≤f/HEP≤3.0, 0.4≤|tan(HAF)|≤3.0, 0.5≤HOS/f≤3.0, |TDT|<60%,|ODT|≤50%, and 0<Σ|InRSI|/InTL≤5.

21. The optical image capturing system of claim 20, wherein at least one surface of at least two of the fourth, the fifth and the sixth lens elements respectively have at least one inflection point.

22. The optical image capturing system of claim 20, wherein the optical image capturing system satisfies the following relation: 0 mm<HOS≤10 mm.

23. The optical image capturing system of claim 20, wherein a distance in parallel with an optical axis from a maximum effective half diameter on the object-side surface of the sixth lens element to an axial point on the object-side surface of the sixth lens element is InRS61, a distance in parallel with the optical axis from a maximum effective half diameter on the image-side surface of the sixth lens element to an axial point on the image-side surface of the sixth lens element is InRS62, a distance in parallel with an optical axis from a maximum effective half diameter on the object-side surface of the seventh lens element to an axial point on the object-side surface of the seventh lens element is InRS71, a distance in parallel with the optical axis from a maximum effective half diameter on the image-side surface of the seventh lens element to an axial point on the image-side surface of the seventh lens element is InRS72, and the following relation is satisfied: 0 mm<|InRS61|+|InRS62|+|InRS71|+|InRS72|≤5 mm.

24. The optical image capturing system of claim 23, wherein the optical image capturing system satisfies the following relation: 0<(|InRS61|+|InRS62|+|InRS71|+|InRS72|)/InTL≤5.

25. The optical image capturing system of claim 23, wherein the optical image capturing system further comprises an aperture stop and an image sensing device, and the image sensing device is disposed on the image plane and has at least 5 million pixels, and a distance from the aperture stop to the image plane is InS, and the following relation is satisfied: 0.5≤InS/HOS≤1.1.

* * * * *